United States Patent
Guo et al.

(10) Patent No.: US 7,483,480 B2
(45) Date of Patent: Jan. 27, 2009

(54) FFT ACCELERATED ITERATIVE MIMO EQUALIZER RECEIVER ARCHITECTURE

(75) Inventors: Yuanbin Guo, Richardson, TX (US); Dennis McCain, Lewisville, TX (US); Joseph R Cavallaro, Pearland, TX (US)

(73) Assignee: Nokia Corporation, Espoo (FI)

(*) Notice: Subject to any disclaimer, the term of this patent is extended or adjusted under 35 U.S.C. 154(b) by 869 days.

(21) Appl. No.: 10/997,442

(22) Filed: Nov. 24, 2004

(65) Prior Publication Data

US 2006/0109897 A1    May 25, 2006

(51) Int. Cl.
H03K 5/159 (2006.01)
H04B 1/10 (2006.01)

(52) U.S. Cl. .................................. 375/232; 375/350

(58) Field of Classification Search ........... 375/147, 375/150, 152, 232, 233, 340, 350
See application file for complete search history.

(56) References Cited

U.S. PATENT DOCUMENTS

| | | | |
|---|---|---|---|
| 6,400,782 B2 * | 6/2002 | Tal et al. | 375/350 |
| 6,873,596 B2 * | 3/2005 | Zhang et al. | 370/210 |
| 6,954,495 B2 * | 10/2005 | Piirainen | 375/233 |
| 2002/0037058 A1 * | 3/2002 | Birru | 375/340 |
| 2004/0125235 A1 * | 7/2004 | Kim et al. | 348/607 |
| 2004/0125895 A1 * | 7/2004 | Buckley et al. | 375/340 |
| 2004/0151236 A1 * | 8/2004 | Lilleberg et al. | 375/150 |
| 2005/0100052 A1 * | 5/2005 | Mailaender et al. | 370/479 |
| 2005/0281323 A1 * | 12/2005 | Mailaender | 375/147 |
| 2007/0165707 A1 * | 7/2007 | Margetts et al. | 375/150 |

OTHER PUBLICATIONS

Guo et al., Scalable FPGA Architectures for LMMSE-based SIMO Chip-Equalizer In HSDPA Downlink, Nov. 9-12, 2003, Signals, Systems and Computers, 2003. Conference Record on the Thirty-Seventh Asilomar Conference on, vol. 2, pp. 2171-2175.*
Zhang, Jianzhong et al., "Efficient Linear Equalization for High Data Rate Downlink CDMA Signaling", IEEE 2003, pp. 141-145.
Foschini, Gerard J., "Layered Space-Time Architecture for Wireless Communication in a Fading Environment When Using Multi-Element Antennas", Bell Labs Technical Journal, 1996, pp. 41-59.
Hooli, Jari, et al., "Chip-Level Channel Equalization in WCDMA Downlink", BURASIP Journal on Applied Signal Processing, 2002, pp. 757-770.
Guo, Yuanbin, et al., "Efficient MIMO Equalization for Downlink Multi-Code CDMA: Complexity Optimization and Comparative Study", IEEE 2004, pp. 2513-2519.

(Continued)

*Primary Examiner*—Mohammad H Ghayour
*Assistant Examiner*—Lawrence B Williams
(74) *Attorney, Agent, or Firm*—Harrington & Smith, PC

(57) ABSTRACT

A receiver, such as a CDMA MIMO receiver, includes a LMMSE-based chip-level equalizer constructed so as to implement a FFT accelerated iterative algorithm having a complexity of order $O(N \log_2(N))$, where N is the dimension of a covariance matrix. The equalizer uses one of an overlap-save or an over-lap add FFT architecture.

60 Claims, 10 Drawing Sheets

OTHER PUBLICATIONS

Guo, Yuanbin, et al., "Scalable FPGA Architectures for LMMSE-based SIMO Chip Equalizer in HSDPA Downlink", 37th IEEE Asilomar Conference on Signals, Systems and Computers, 2003, 5 pages.

Kermoal, Jean Philippe et al., "A Stochastic MIMO Radio Channel Model With Experimental Validation", IEEE Journal On Selected Areas In Communications, vol. 20, No. 6, Aug. 2002, pp. 1211-1226.

Golden, G.D. et al., "Detection algorithm and initial laboratory results using V-Blast space-time communication architecture", Electronics Letters, vol. 35, Jan. 1999, pp. 14-15.

Wiesel, Ami et al., "Turbo linear dispersion space time coding for MIMO HSDPA systems", 12th IST Summit on Mobile and Wireless Communications, Jun. 15-18, 2003, Aveiro, Portugal, 5 pages.

Radosavljevic, Predrag et al., "ASIP Architecture Implementation of Channel Equalization Algorithms for MIMO Systems In WCDMA Downlink", IEEE 2004, pp. 1735-1739.

Krauss, Thomas P., et al. "MMSE Equalization For Forward Link In 3G CDMA: Symbol-Level Versus Chip-Level", IEEE 2000, pp. 18-22.

Heikkila, Markku J. et al., "Space-Time Equalization Using Conjugate-Gradient Algorithm In WCDMA Downlink", IEEE 2002, pp. 673-677.

I-METRA project consortium, "The IST-2000-30148 I-METRA project", http://www.ist-imetra.org.

\* cited by examiner

US 7,483,480 B2

FFT ACCELERATED ITERATIVE MIMO EQUALIZER RECEIVER ARCHITECTURE

TECHNICAL FIELD

This invention relates generally to wireless communications systems and methods and, more specifically, relates to equalizers usable in receivers of signals sent through a channel, such as a multipath channel.

BACKGROUND

There are certain receivers that are usable with, as an example, multiple input, multiple output (MIMO) code division multiple access (CDMA) signals. MIMO technology, that uses multiple antennas at both the transmitter and the receiver, has recently emerged as a significant breakthrough to increase spectral efficiency. Early efforts in this area are known as D-BLAST, see G. J. Foschini, "Layered space-time architecture for wireless communication in a fading environment when using multi-element antennas", *Bell Labs Tech. J.*, pp. 41-59, 1996, and a more realistic strategy known as V-BLAST, see G. D. Golden, J. G. Foschini, R. A. Valenzuela, and P. W. Wolniansky, "Detection algorithm and initial laboratory results using V-BLAST space-time communication architecture," *Electron. Lett.*, vol. 35, pp. 14-15, January 1999. To support multimedia services, UMTS and CDMA2000 extensions optimized for data services have lead to the standardization of Multi-Code CDMA systems-such as the High-Speed-Downlink-Packet-Access (HSDPA) and its equivalent 1×EV-DV (Evolution Data and Voice). Recently, MIMO extensions for the 3G wireless systems have received more and more attentions from the research community, as evidenced by A. Wiesel, L. García, J. Vidal, A. Pagès, Javier R. Fonollosa, "Turbo linear dispersion space time coding for MIMO HSDPA systems", 12$^{th}$ IST Summit on Mobile and Wireless Communications, Jun. 15-18, 2003, Aveiro, Portugal.

However, originally the MIMO-based spatial multiplexing was proposed for narrow band and flat-fading channels. In a multipath-fading channel, the orthogonality of the spreading codes is destroyed and Multiple-Access-Interference (MAI), along with the Inter-Symbol-Interference (ISI), is introduced. The conventional Rake receiver does not provide satisfactory performance with a small spreading gain.

The LMMSE (Linear-Minimum-Mean-Square-Error)-based chip-level equalizer has the potential to restore the orthogonality of the spreading code, and to suppress both the ISI and MAI. Reference in this regard can be made to K. Hooli, M. Juntti, M. J. Heikkila, P. Komulainen, M. Latvaaho, J. Lilleberg, "Chip-level channel equalization in WCDMA downlink", *EURASIP Journal on Applied Signal Processing*, August 2002, pp. 757-770, and to M. J. Heikkila, K. Ruotsalainen and J. Lilleberg, "Space-time equalization using conjugate-gradient algorithm in WCDMA downlink", IEEE Proceeding in PIMRC, pp. 673-677, 2002. However, the use of the LMMSE equalizer involves the inverse of a large correlation matrix with a complexity at the order of $O((NF)^3)$, where N is the number of receive (Rx) antennas and F is the channel length. This can be prohibitively complex for realizing a real-time hardware implementation (see P. Radosavljevic, J. R. Cavallaro, A. D. Baynast, "Implementation of channel equalization for MIMO systems in WCDMA downlink", submitted to ICASSP 2004, and Y. Guo, J. Zhang, D. McCain, J. R. Cavallaro, "Scalable FPGA architectures for LMMSE-based SIMO chip equalizer in HSDPA downlink", 37$^{th}$ IEEE Asilomar Conference on Signals, Systems and Computers, 2003.

The fact that the MIMO CDMA receiver is to be embedded into a portable device makes the design of low complexity mobile receivers very critical for widespread commercial deployment of low cost products. To avoid the Direct-Matrix-Inverse (DMI), adaptive stochastic gradient algorithms such as LMS could be applied (see, in this regard, the above cited K. Hooli et al.) However, such adaptive stochastic gradient algorithms suffer from stability problems because the convergence depends on the choice of good step size.

Because the system is Hermitian and positive definite, a Conjugate Gradient algorithm has been proposed for iterative computation of the equalizer taps (see the above-cited M. J. Heikkila et al. and P. Radosavljevic et al.) The complexity of the CG is at the order of $O((NF)^2)$, which may be considered as a fast version algorithm. However, when multi-antenna receiver is applied, the signal dimension increases. The required MIMO equalizer filter length is high and the co-variance matrix has a very large eigen value spread. Although multiplication is not very expensive, and is relatively easy to implement on computers and is effectively parallelizable for structured matrices represented in compressed form, the structure rapidly deteriorates during the process of the iteration. The resulting complexity is still excessive for a hardware implementation (see Y. Guo, J. Zhang, D. McCain, J. Cavallaro, "Efficient MIMO equalization for downlink multi-code CDMA: complexity optimization and comparative study", submitted to IEEE GlobeCom 2004.

In the following publications: V. Y. Pan, A. Zheng, "Superfast algorithms for Cauchy-like matrix computations and extensions", Linear algebra and its applications, 310, 83-108, 2000, and V. Y. Pan, "Structured matrices and polynomials: unified superfast algorithms", Springer, 2001, the authors presented superfast algorithms for structured matrices. For an N-dimension matrix, a superfast algorithm should have the complexity at the order of $O(N \log_2(N))$.

A FFT-based solution of the equalizer using circulant approximation is proposed by the above cited J. Zhang et al., and by the above-noted Y. Guo, J. Zhang, D. McCain, J. Cavallaro, "Efficient MIMO equalization for downlink multi-code CDMA: complexity optimization and comparative study", submitted to IEEE GlobeCom 2004. However, circular corners need to be added to approximate the block Toeplitz structure with circulant structure. This may increase the condition number and reduce the system stability. In very high Signal-to-Noise-Ratio (SNR) and high Geometry range, the high condition number tends to degrade the system performance.

SUMMARY OF THE PREFERRED EMBODIMENTS

The foregoing and other problems are overcome, and other advantages are realized, in accordance with the presently preferred embodiments of the teachings of this invention.

In one aspect the embodiments of this invention provide an equalizer that comprises apparatus that implements a Fast Fourier Transform FFT accelerated iterative algorithm having a complexity of order $O(N \log_2(N))$, where N is the dimension of a covariance matrix.

In another aspect thereof embodiments of this invention provide a code division multiple access CDMA receiver that comprises a LMMSE-based chip-level equalizer having a Finite Impulse Response FIR filter coupled to an output of a covariance estimator and tap solver that is operable to implement a Fast Fourier Transform FFT accelerated iterative algorithm having a complexity of order $O(N \log_2(N))$, where N is the dimension of a covariance matrix. The tap solver features one of an overlap-save or an overlap-add FFT architecture.

In a still further aspect of the teachings of this invention there is provided an equalizer that comprises covariance estimator and tap solver means having an output coupled to a Finite Impulse Response filter means, where the covariance estimator and tap solver means executes a Fast Fourier Transform FFT accelerated iterative procedure that exhibits a complexity of order $O(N \log_2(N))$, where N is the dimension of a covariance matrix.

In another aspect thereof embodiments of this invention provide a method to receive a signal from a multipath channel. The method includes receiving the signal with at least one receive antenna; and equalizing the received signal by executing a Fast Fourier Transform FFT accelerated iterative procedure having a complexity of order $O(N \log_2(N))$, where N is the dimension of a covariance matrix.

In a still further aspect thereof embodiments of this invention provide a data storage medium that stores program instructions to direct a data processor to equalize a signal received with at least one antenna from a multipath channel, and comprise an operation of executing a Fast Fourier Transform FFT accelerated iterative procedure having a complexity of order $O(N \log_2(N))$, where N is the dimension of a covariance matrix.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
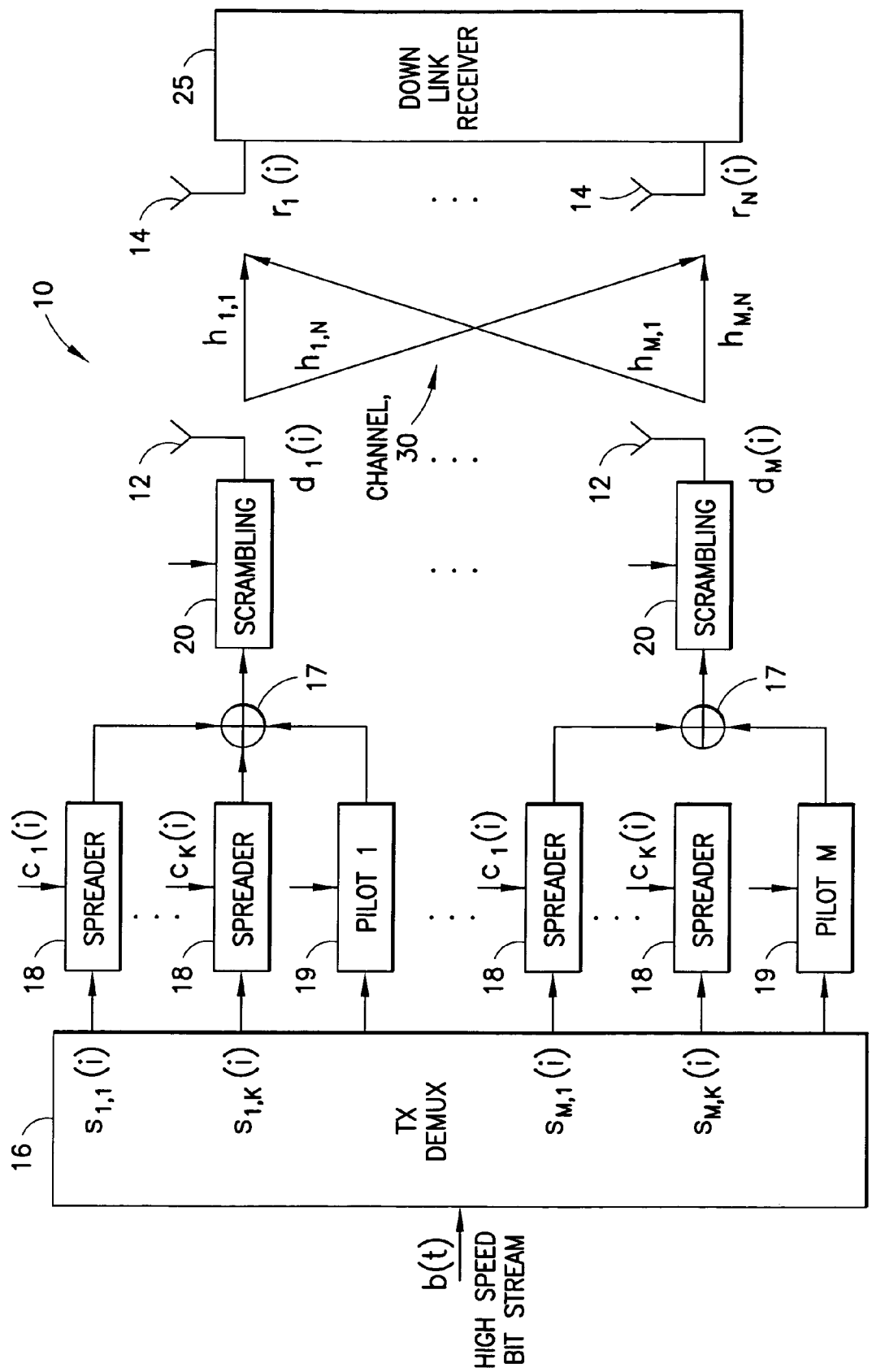
FIG. 1 is a block diagram showing a system model of a MIMO multi-code CDMA downlink.

By way of introduction, in certain preferred yet non-limiting embodiments thereof this invention provides a LMMSE-based chip-level equalizer operable to recover the orthogonality between the spreading codes of MIMO CDMA downlink signals in a multi-path fading channel. In this context "downlink" can refer to the signals transmitted from a cellular base station to a mobile station, such as a handheld communications terminal that includes a CDMA receiver that incorporates the equalizer in accordance with the preferred embodiments of this invention. The equalizer solves a matrix inverse problem with very high complexity, of the order of $O(N^3)$, where N is the dimension of the covariance matrix. While an iterative Conjugate-Gradient (CG) algorithm can be applied to avoid the Direct-Matrix-Inverse (DMI), with complexity $O(N^2)$ (which falls into the category of fast solutions), the hidden constant in the standard CG algorithm is still high, especially for a high-dimension MIMO system and long delay spread channels.

It is pointed out that a chip-level equalizer implies that the system model is intended to recover chip samples as opposed to symbol samples (in the MMSE criteria). In a typical CDMA system the front-end samples are spread by the spreading codes, and the chip-level equalizer functions as a front-end to deal with multipath channel effects. In this case there will be a despreader that follows the chip-level equalizer to detect the symbols.

As will be made apparent below, the FFT-accelerated iterative equalizer is suitable for use in CDMA systems, but is not limited for use in only CDMA systems. If one examines the system equations presented below it will become apparent that the embodiments of this invention can be used to advantage in various types, other than CDMA, of MIMO multipath channels. The preferred embodiments of this invention are presented below in the general context of a CDMA downlink, as there is a clear and strong motivation to use the chip-level equalizer as a CDMA front-end to estimate the chip samples and restore the spreading code orthogonality to suppress inter-symbol interference. However, the teachings of this invention are not limited for use with only CDMA communication systems.

In accordance with embodiments of this invention, a FFT-accelerated iterative algorithm is employed to reduce the complexity to $O(N \log_2(N))$, a complexity that lies in the category of superfast algorithms. The equalizer first transforms the direct form block-Toeplitz structure in the CG iteration to a reverse form block-Toeplitz structure. The time-domain matrix multiplication is accelerated by an equivalent frequency-domain circular convolution having, in one non-limiting embodiment, a FFT-based "overlap-save" architecture. The iteration then rapidly refines a crude initial approximation to derive the actual final equalizer tap values. Unlike the FFT-based equalizer that approximates the Toeplitz structure with a circulant structure by adding corners, the FFT-accelerated iterative algorithm does not increase the condition number of the system, and demonstrates strong numerical stability with a rapid convergence rate. Simulations show a good performance and complexity tradeoff; particularly for very long delay spread channels.

It is shown that the iteration of the CG is essentially reduced to performing matrix multiplication for the correlation matrix once per iterative step. Because the correlation matrix assumes a block-Toeplitz structure, the invention applies a divide-and-conquer methodology to the CG iteration to accelerate the computation. The method first transforms the direct form block-Toeplitz structure of the correlation matrix in the CG iteration to a reversed form block-Toeplitz structure. The new time-domain matrix multiplication is accelerated by the equivalent FFT-based "overlap-save" computing architecture in the frequency domain, and superfast acceleration to the order of $O(N \log_2(N))$ is achieved. The algorithm is strongly stable for well and mildly conditioned systems. In a further embodiment the time-domain matrix multiplication is accelerated by the equivalent FFT-based "overlap-add" computing architecture in the frequency domain.

An exemplary model of a system 10 for a MIMO Multi-Code CDMA downlink using spatial multiplexing is depicted in FIG. 1. M Tx antennas 12 and N Rx antennas 14 are used in the system 10, where usually $M \leq N$. In a MC-CDMA system, such as HSDPA, multiple spreading codes are assigned to a single user to achieve a high data rate. First, the high data rate symbols are demultiplexed in demultiplexer block 16 into K*M lower rate substreams, where K is the number of spreading codes used in the system for data transmission. The substreams are broken into M groups, where each substream in the group is spread in an associated spreader 18 with a spreading code of spreading gain G. The groups of substreams are then combined at summing nodes 17 and scrambled with long scrambling codes in scramblers 20 and transmitted through the $m^{th}$ Tx antenna 12 to a receiver 25 via a channel 30. The chip-level signal at the $m^{th}$ transmit antenna 12 is given by, $$d_m(i) = \sum_{k=1}^{K} s_m^k(j) \cdot c_m^k[i] + s_m^P(j) \cdot c_m^P[i], \quad (1)$$

where j is the symbol index, i is chip index and k is the index of the composite spreading code. $s_m^k[j]$ is the $j^{th}$ symbol of the $k^{th}$ code at the $m^{th}$ substream.

The following discussion focuses on the $j^{th}$ symbol index, and omits the index for simplicity. $c_m^k[i] = c^k[i] c_m^{(s)}[i]$ is the composite spreading code sequence for the $k^{th}$ code at the $m^{th}$ substream, where $c^k[i]$ is the user-specific Hadamard spreading code and $c_m^{(s)}[i]$ is the antenna-specific scrambling long code. $s_m^P[j]$ denotes the pilot symbols at the $m^{th}$ antenna. $c_m^P[i] = c^P[i] c_m^{(s)}[i]$ is the composite spreading code for pilot symbols at the $m^{th}$ antenna 12 applied via pilot spreaders 19. The received chip-level signal at the $n^{th}$ Rx antenna 14 is given by $$r_n(i) = \sum_{m=1}^{M} \sum_{l=0}^{L_{m,n}} h_{m,n}(l) d_m(i - \tau_l) + v_n(i). \quad (2)$$

The channel 30 is characterized by a channel matrix between the $m^{th}$ Tx antenna 12 and the $n^{th}$ Rx antenna 14 as $$h_{m,n}(t) = \sum_{l=0}^{L_{m,n}} h_{m,n}(l) \delta(t - \tau_{m,n,l}). \quad (3)$$

By collecting the L=2F+1 consecutive chips with center at the $i^{th}$ chip from each of the N Rx antennas 14 in a signal vector $r_n(i) = [r_n(i+F), \ldots, r_n(i), \ldots, r_n(i-F)]^T$ and packing the signal vectors from each receive antenna 14, a signal vector is formed as $\overline{r_A}[i] = [r_1(i)^T, \ldots, r_n(i)^T, \ldots, r_N(i)^T]^T$. In the vector form, the received signal can be given by, $$\overline{r_A}[i] = \sum_{m=1}^{M} H_m d_m(i) + V(i), \quad (4)$$

where V(i) is the additive Gaussian noise, and the transmitted chip vector for the $m^{th}$ transmit antenna is given by $d_m(i) = d_m(i+F), \ldots, d_m(i), \ldots, d_m(i-F-L)]^T$. The channel matrix from multiple transmit and receive antennas 12, 14 is defined as $$H_m = \begin{bmatrix} H_{m,1} \\ H_{m,2} \\ \vdots \\ H_{m,N} \end{bmatrix},$$

$$H_{m,n} = \begin{bmatrix} h_{m,n}(0) & \cdots & h_{m,n}(L) & & 0 \\ 0 & h_{m,n}(0) & \cdots & h_{m,n}(L) & \\ & & \vdots & & \\ & & \vdots & & \\ 0 & & h_{m,n}(0) & & h_{m,n}(L) \end{bmatrix}.$$

A discussion is now made of the LMMSE Chip-Level Equalizer in accordance with preferred embodiments of this invention.

Figure 2:
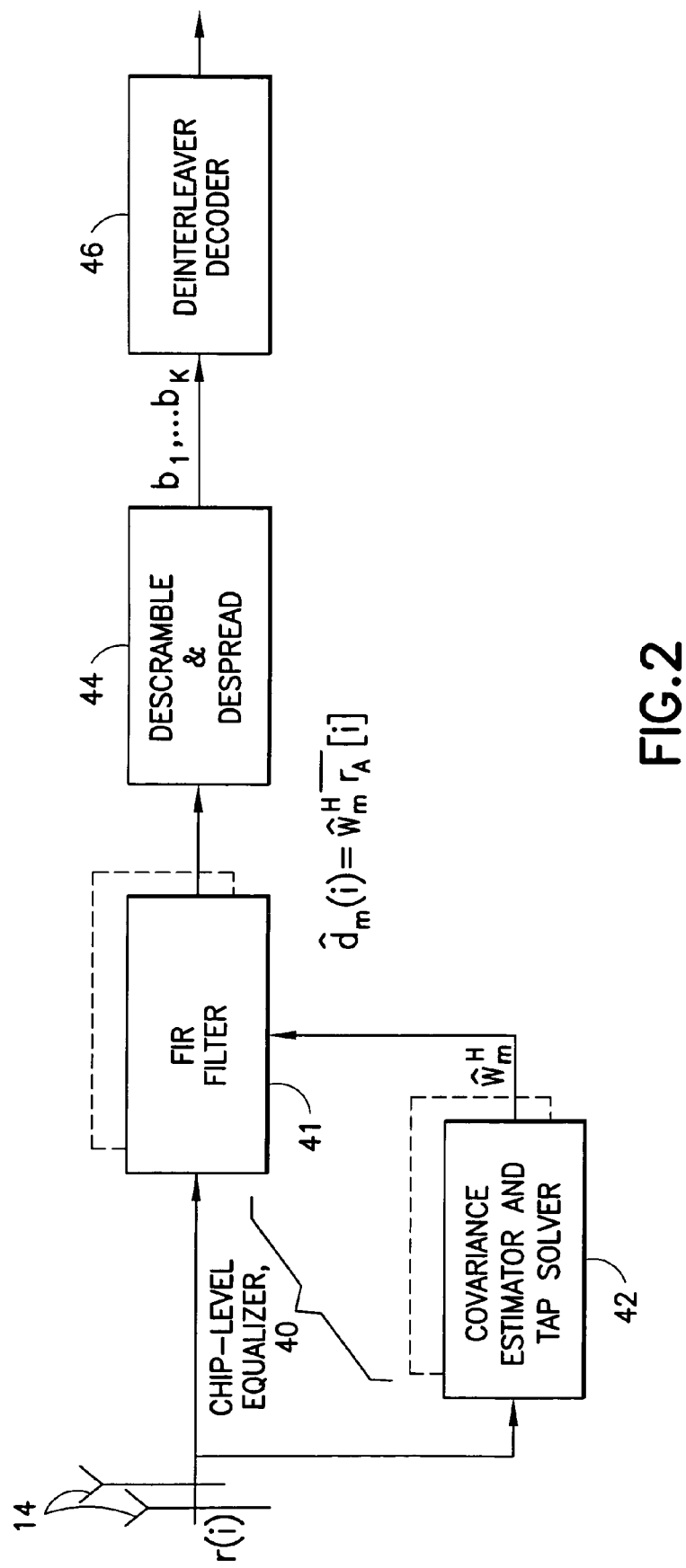
FIG. 2 is block diagram of a LMMSE chip-level equalizer.

Chip-level equalization is attractive for implementing a single-user CDMA downlink receiver. As is shown in FIG. 2, the chip-level equalizer 40 includes a Finite Impulse Response (FIR) filter 41 that operates with a covariance estimator and tap solver 42, and that outputs a chip-level equalized signal to a descrambler and despreader 44, that in turn outputs a signal to a deinterleaver and decoder 46.

It is noted at this point that the FFT-accelerated iterative algorithm in accordance with the embodiments of this invention can be advantageously implemented in the covariance estimator and tap solver 42. The equalizer 40 per se actually may be divided into two major parts or components: the covariance estimator and tap solver 42 to solve the matrix inverse system equation; and the FIR filter 41 that uses the taps computed by the covariance estimator and tap solver 42 using the presently preferred adaptive algorithm. The chip-level equalizer 40 in FIG. 2, for simplicity, is thus shown as including the FIR filter 41 component coupled to an output of the covariance estimator and tap solver 42 component that preferably implements the presently preferred embodiments of this invention, as will now be described in further detail.

The chip-level equalizer 40 estimates the transmitted chip samples by a set of linear FIR filter 41 coefficients as, $$\hat{d}_m(i) = \hat{w}_m^H \overline{r_A}[i] \quad (5)$$

$$= (\hat{w}_{m,1}^H \hat{w}_{m,2}^H \cdots \hat{w}_{m,N}^H) \begin{pmatrix} r_1[i] \\ r_2[i] \\ \vdots \\ r_N[i] \end{pmatrix}.$$

There are currently two major types of equalization, i.e., the non-adaptive linear equalizer and the adaptive linear equalizer. Non-adaptive linear equalizers typically assume stationarity of the channel 30 in an observation window, and the equalizer is designed with criteria such as LMMSE or zero forcing. It is well known that the LMMSE solution is given by:

$$\hat{w}_m^{opt} = \arg\min E\left[\|d_m(i) - \hat{w}_m^H \bar{r}_A[i]\|^2\right], \quad (6)$$
$$= \sigma_d^2(i) R_{rr}(i)^{-1} E[\bar{r}_A[i] d_m^H(i)]$$

where the correlation matrix is given by the time-average, with ergodicity assumption as $$R_{rr} = E[\bar{r}_A(i)\bar{r}_A^H(i)] = \frac{1}{N_B} \sum_{i=0}^{N_B-1} \bar{r}_A(i)\bar{r}_A^H(i) \quad (7)$$

and the channel coefficients are estimated as $$\hat{h}_m = E[\bar{r}_A[i] d_m^H(i)] \quad (8)$$

using the pilot symbols. In the HSDPA standard, approximately 10% of the total transmit power is dedicated to the Common Pilot Channel (CPICH). This approach provides an accurate channel estimation.

Conjugate Gradient Equalizer

As was noted above, the chip-level equalizer 40 may be considered to include two major components: the covariance estimator and tap solver 42 to compute the equalizer filter taps as in equation (6), and the FIR filters 41 as in equation (5) to equalize the multipath channel. A direct matrix inverse based solution using Cholesky decomposition involves complex multiplications and division operations at the order of $O(N^3)$ for a N-dimension matrix. However, this is very difficult to achieve for a hardware-based real-time implementation. At least for this reason adaptive solutions, such as the Least-Mean-Square (LMS) algorithm, have been proposed for more practical implementations. However, when multiple receive antennas 14 are used, the convergence speed of the adaptive chip-level algorithms becomes a limiting factor. Under unfavorable channel conditions, the signal covariance matrix has a large spectral condition number. This slows the convergence rate dramatically and leads to unsatisfactory performance in a fast fading environment.

To accommodate the large eigen value spread in the multi-antenna receiver 25, an iterative Conjugate-Gradient algorithm was proposed for a single-input, multiple-output (SIMO) space-time receiver by M. J. Heikkila, K. Ruotsalainen and J. Lilleberg, "Space-time equalization using conjugate-gradient algorithm in WCDMA downlink", IEEE Proceeding in PIMRC, pp. 673-677, 2002, and for the MIMO receiver described by P. Radosavljevic, J. R. Cavallaro, A. D. Baynast, "Implementation of channel equalization for MIMO systems in WCDMA downlink", submitted to ICASSP 2004. In the MIMO system, for the $m^{th}$ transmit antenna, there are two steps involved with a total of J iterations. The complete CG algorithm is given as follows:

Initialization $$w_{m,0}=0$$

$$\gamma_0 = h_m; \Delta_0 = h_m$$

$$\delta_0 = \gamma_0^H \gamma_0; \delta_2 = \delta_0 \quad (9)$$

Iteration: for j=1:J $$\Gamma_j = R_{rr}\Delta_{j-1}; \delta_{j-1} = \Gamma_j^H \Gamma_j$$

$$\alpha = \delta_j/\Delta_{j-1}^H \Gamma_j; \beta = \delta_{j-1}/\delta_j$$

$$w_{m,j} = w_{m,j-1} + \alpha \Delta_{j-1}$$

$$\gamma_j = \gamma_{j-1} - \alpha \delta_j$$

$$\Delta_j = \Gamma_j + \beta \Delta_{j-1} \quad (10)$$

Time-Domain Matrix-Vector Multiplication

The original CG algorithm involves the following significant computations in terms of complex multiplications: the dot product of $\delta_0 \gamma_0^H \gamma_0$; $\delta_{j+1} = \Gamma_j^H \Gamma_j$; $\Delta_{j-1}^H \Gamma_j$; the matrix multiplication in $\Gamma_j = R_{rr}\Delta_{j-1}$, and many vector scaling computations. Among these, the matrix-vector multiplication $\Gamma_j = R_{rr} \Delta_{j-1}$ in the iteration has the dominant complexity. It could be shown that both the covariance matrix and the channel estimation vector could be partitioned to sub-matrix and vectors according to the number of receive antennas 14. The covariance matrix has the size of N(L+1)*N(L+1) and can be partitioned as, $$R_{rr} = \begin{bmatrix} R_{11} & \cdots & R_{1N} \\ \vdots & \ddots & \vdots \\ R_{N1} & \cdots & R_{NN} \end{bmatrix} \quad (11)$$

where each of the sub matrices $R_{n1,n2}$ is the cross-covariance matrix of two antennas 14. The $\Delta_{j-1}$ vector is a N*(L+1) vector and can also be partitioned as $\Delta_{j-1} = [\Delta_{j-1,1}, \ldots, \Delta_{j-1,N}]^T$, where the second index is the receive antenna index. Thus, the matrix-vector multiplication $\Gamma_j = R_{rr}\Delta_{j-1}$ is partitioned into sub-blocks as, $$\Gamma_j = \begin{bmatrix} \sum_{n=1}^{N} R_{1N}\Delta_{j-1,n} \\ \vdots \\ \sum_{n=1}^{N} R_{Nn}\Delta_{j-1,n} \end{bmatrix} \quad (12)$$

Figure 3:
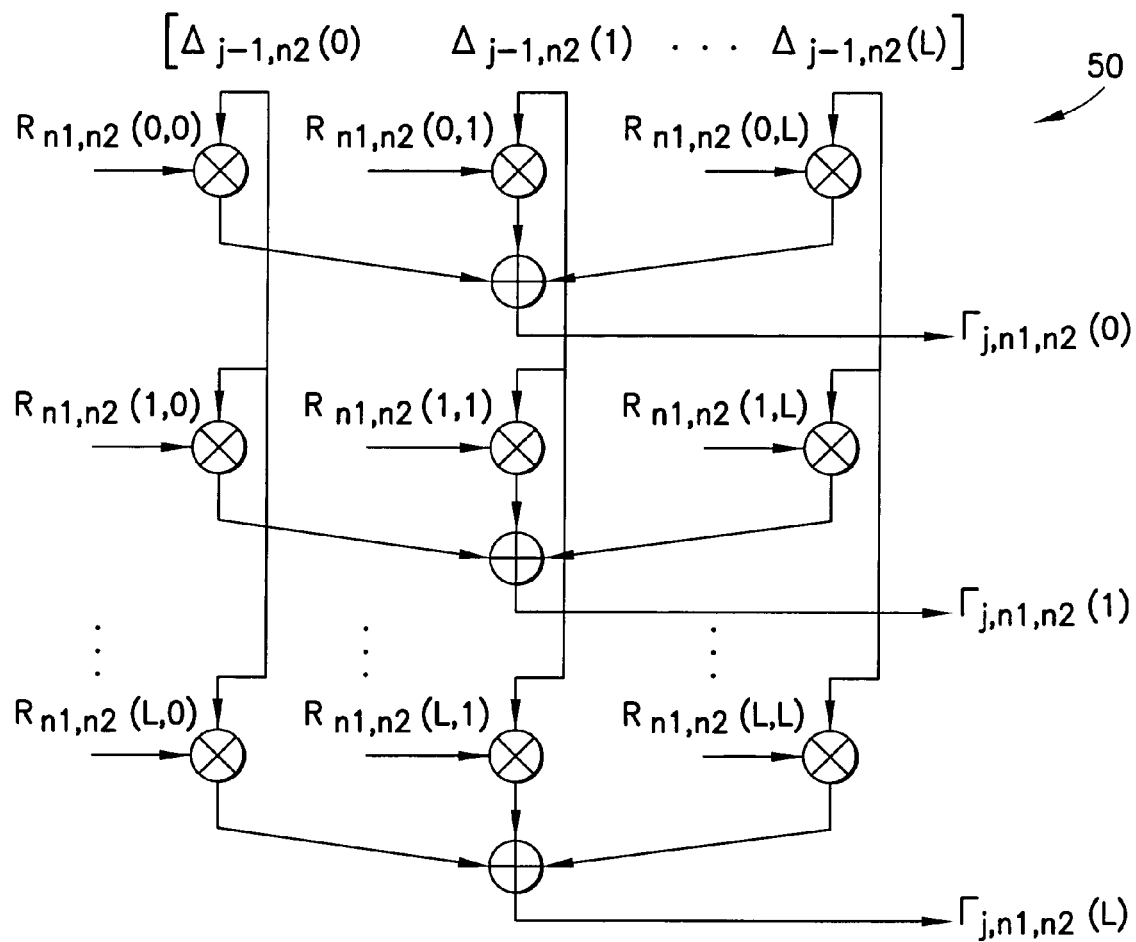
FIG. 3 shows a VLSI architecture for DMM computation.

A straightforward VLSI architecture 50, in hardware form, of the Direct-form sub Matrix-vector Multiplication (DMM) $\Gamma_{j,n1,n2} = R_{n1,n2}\Delta_{j-1,n2}$ is shown in FIG. 3, where m(l) means the $l^{th}$ element of the matrix/vector M.

The complexity for a single sub-block computation is shown in Table I, if one assumes that the size of the correlation matrix is L+1. The memory access includes (L+1)*(L+1) to store the $R_{n1,n2}$ matrix and (L+1) for the $\Delta$ and $\Gamma$ vectors, respectively.

TABLE I

COMPLEXITY OF DIRECT MATRIX MULTIPLICATION

| Operation | Complexity |
|---|---|
| MULT | (L + 1) * (L + 1) |
| ADD | (L + 1) * L |
| MEM | (L + 1) * (L + 1) + 2(L + 1) |

The convergence of the CG algorithm depends on the spectral condition number of the signal covariance matrix. The space-time covariance matrix may have a large eigen value spread which slows down the convergence rate, especially for the MIMO system. To capture the channel fading speed, it requires at least one or two updates of the equalizer filters in one WCDMA slot (0.67 ms). Although the CG algorithm basically reduces the order of complexity to $O(L^2)$, the hidden constant in the CG is still high when many iterations are required to reach convergence. This limits the real-time implementation in a compact hardware embodiment.

Frequency-Domain Computing Architecture

However, using the stationarity of the channel and the convolution property, one may show that the covariance matrix is a banded block Toeplitz matrix with only N(L+1) independent elements. Each submatrix has the format of $$R_{n1,n2} = \begin{bmatrix} E_{n1,n2}[0] & \cdots & \vdots & E^*_{n1,n2}[L] \\ E_{n1,n2}[1] & \ddots & & E^*_{n1,n2}[L-1] \\ \vdots & & \ddots & \vdots \\ E_{n1,n2}[L] & \cdots & \vdots & E_{n1,n2}[0] \end{bmatrix} \quad (13)$$

By defining the upper triangular corner matrix as $$C_L^{n1,n2} = \begin{bmatrix} E_{n1,n2}[L] & \cdots & E_{n1,n2}[1] \\ & \ddots & \vdots \\ 0 & & E_{n1,n2}[L] \end{bmatrix}, \quad (14)$$

one may expand the $R_{n1,n2}$ matrix to a larger matrix with concatenation in the following way:

$$Z_{n1,n2} = \left[ \begin{bmatrix} C_L^{n1,n2} \\ \underline{0}_{L\times L} \end{bmatrix} R_{n1,n2} \begin{bmatrix} \underline{0}_{L\times L} \\ (C_L^{n1,n2})^H \end{bmatrix} \right].$$

It can be shown that this is a Toeplitz matrix with size of $(L+1)\times(3L+1)$. Thus the matrix computation by the correlation matrix is equal to $$\Gamma_{j,n1,n2} = R_{n1,n2}\Delta_{j-1,n2} = Z_{n1,n2} \begin{bmatrix} \underline{0}_{L\times 1} \\ \Delta_{j-1,n2} \\ \underline{0}_{L\times 1} \end{bmatrix} \quad (15)$$

$$= \begin{bmatrix} E_{n1,n2}[L] & E_{n1,n2}[1] & E_{n1,n2}[0] & \cdots & E^*_{n1,n2}[L] & 0 & 0 \\ 0 & \ddots & & \ddots & \ddots & & \ddots \\ & & E_{n1,n2}[L] & & & & 0 \\ 0 & & 0 & E_{n1,n2}[L] & \cdots & E_{n1,n2}[0] & E^*_{n1,n2}[L] \end{bmatrix} * \begin{bmatrix} \underline{0}_{L\times 1} \\ \Delta_{j-1,n2} \\ \underline{0}_{L\times 1} \end{bmatrix}.$$

Figure 4:
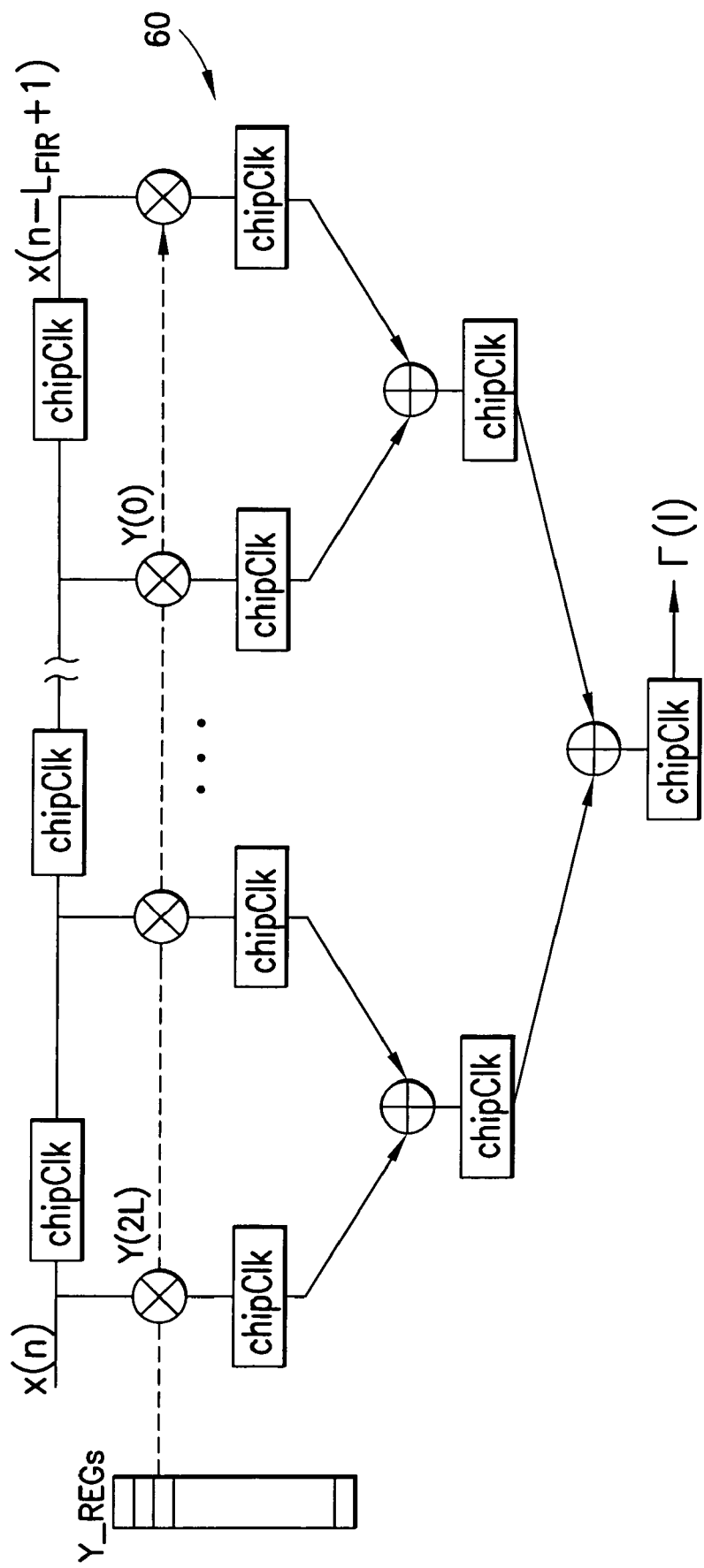
FIG. 4 illustrates a Direct-Form Finite Impulse Response (FIR) filtering architecture for a matrix-vector multiplication in a CG tap solver.

From the sliding window feature of the $Z_{n1,n2}$ matrix, the matrix-vector multiplication is actually a linear convolution, where the filter taps vector is $Y_{n1,n2}=[E_{n1,n2}*[L], \ldots, E_{n1,n2}*[1], E[0], E, \ldots, E_{n1,n2}[L]]$ and the input data vector is $X_{n2}=[\underline{0}_{1\times L} (\Delta_{j-1,n2})^T \underline{0}_{1\times L}]$. This linear convolution can be implemented using the time-domain linear FIR filter either in the direct-form or transposed computation architecture. The general equation is given by $$\Gamma_{j,n1,n2}[l] = \sum_{k=0}^{2L} y_{n1,n2}(k)\Delta_{j-1,n2}(L+l-k) \quad (16)$$

for $(\Delta_{j-1,n2}(l)=0, l<0; l>L)$. One advantage of this approach is that it facilitates the definition of the pipelining from the time-domain FIR filtering architecture. A VLSI architecture 60 example for the direct-form FIR filtering is shown in FIG. 4.

Frequency Domain FFT Acceleration

Despite its more regular VLSI architecture, the FIR filtering architecture 60 has the computation complexity of $(2L+1)*(L+1)$ multiplications, where only $(L+1)*(L+1)$ multiplications are non-trivial for non-zero values. As a result, the overall complexity of the CG is still at the order of $O(N^2)$. However, from the FIR filtering interpretation and the features of FFT algorithm, one may implement the linear convolution from circular convolution by using FFT in the frequency-domain. To convert the circular convolution to the linear convolution, one needs to consider the edges to avoid frequency alias. It is known that there are two equivalent architectures for the FFT-based filtering of a long sequence, i.e., the "overlap-add" and the "overlap-save" architectures. Because of the simplicity in the control logic design, the "overlap-save" based computing architecture shown in FIGS. 5A and 5B is presently preferred, although the "overlap-add" based architecture, shown in FIG. 6, is also discussed below.

Figure 5A:
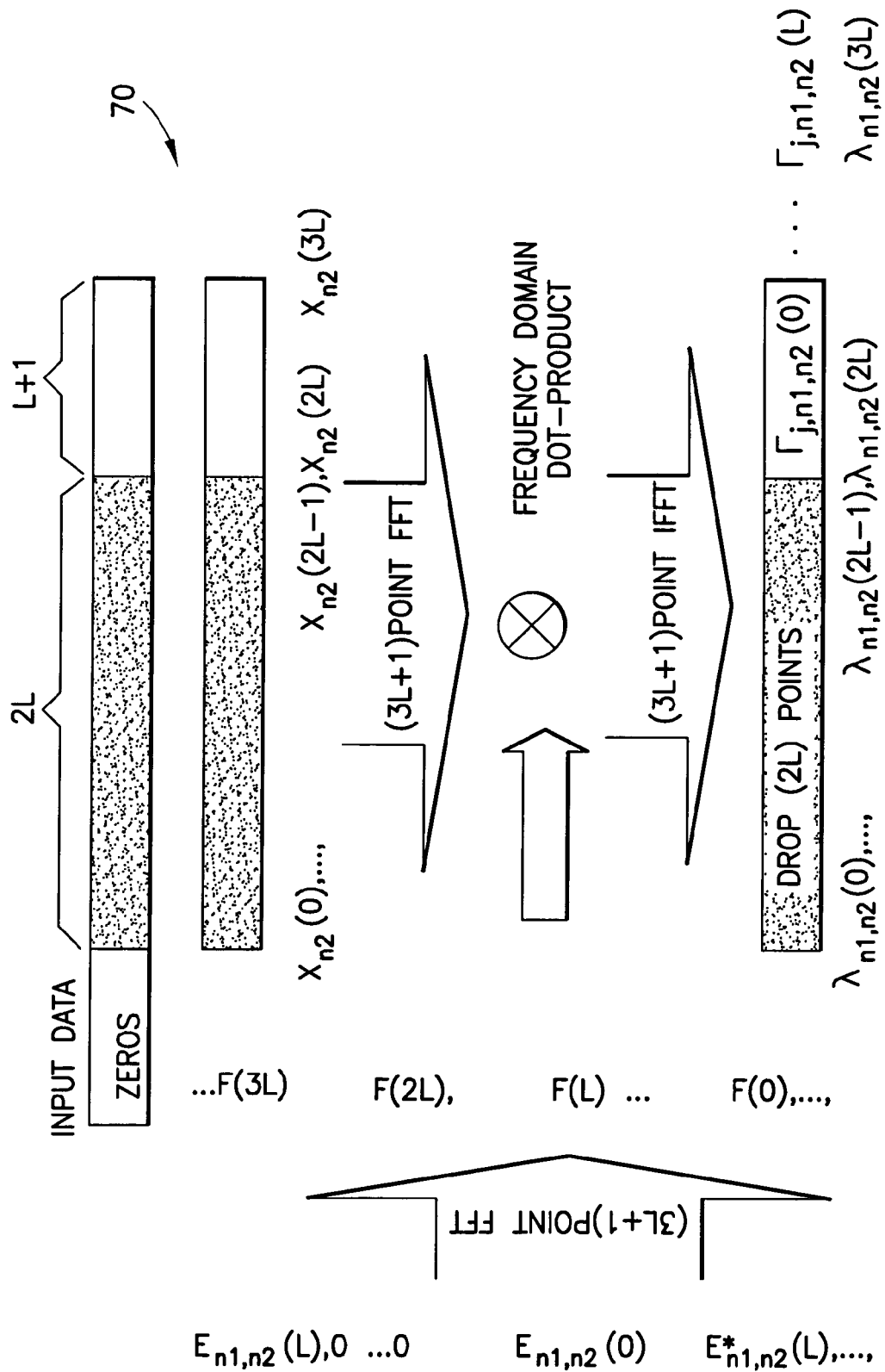
FIG. 5A illustrates a first embodiment of an "overlap-save" FFT-based architecture in accordance with the teachings of this invention, where the diagram is illustrative of both a hardware embodiment and a process embodiment.
Figure 5B:
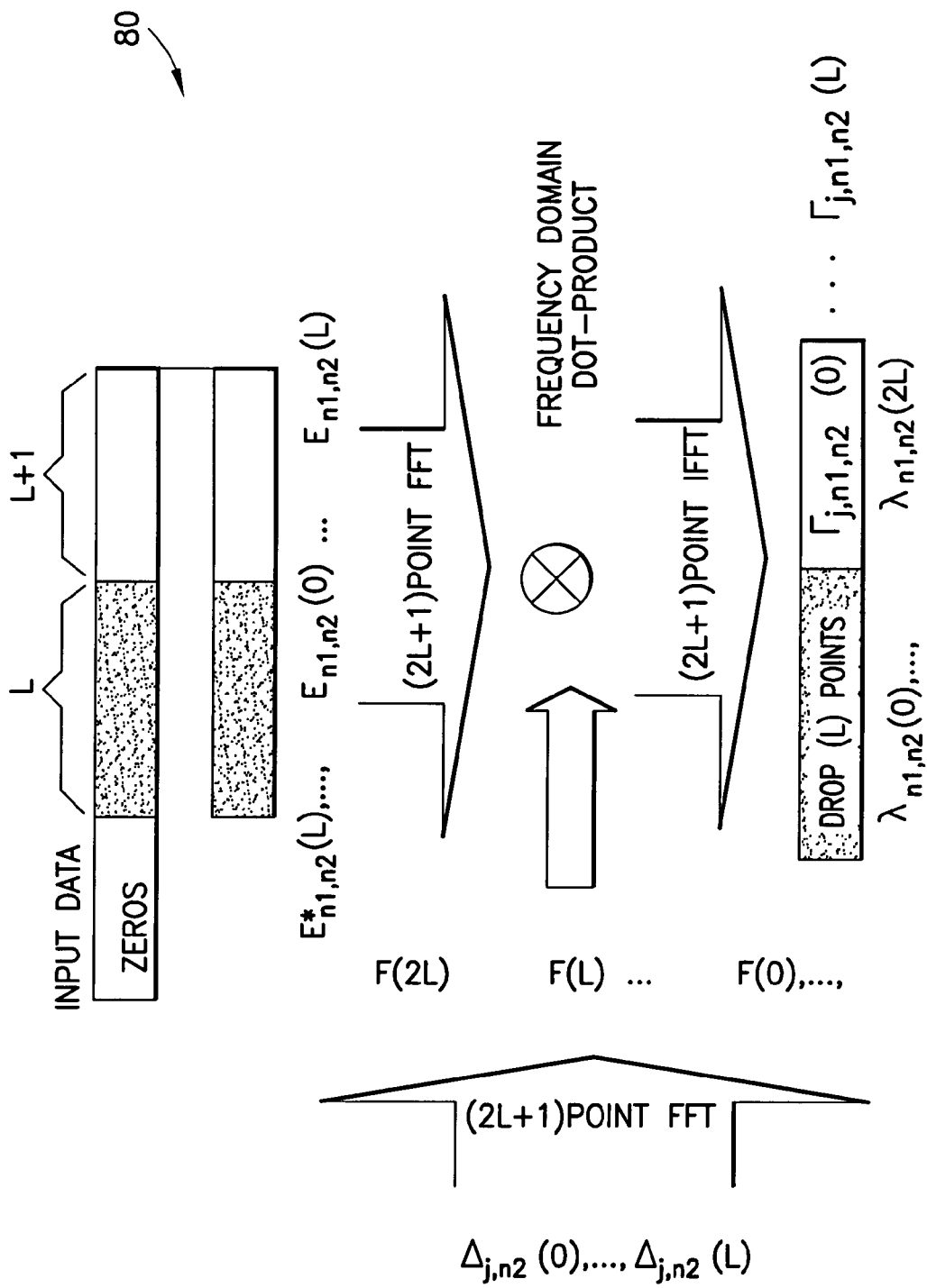
FIG. 5B illustrates a second, reduced complexity embodiment of the "overlap-save" FFT-based architecture further in accordance with the teachings of this invention, where the diagram is illustrative of both a hardware embodiment and a process embodiment.
Figure 6:
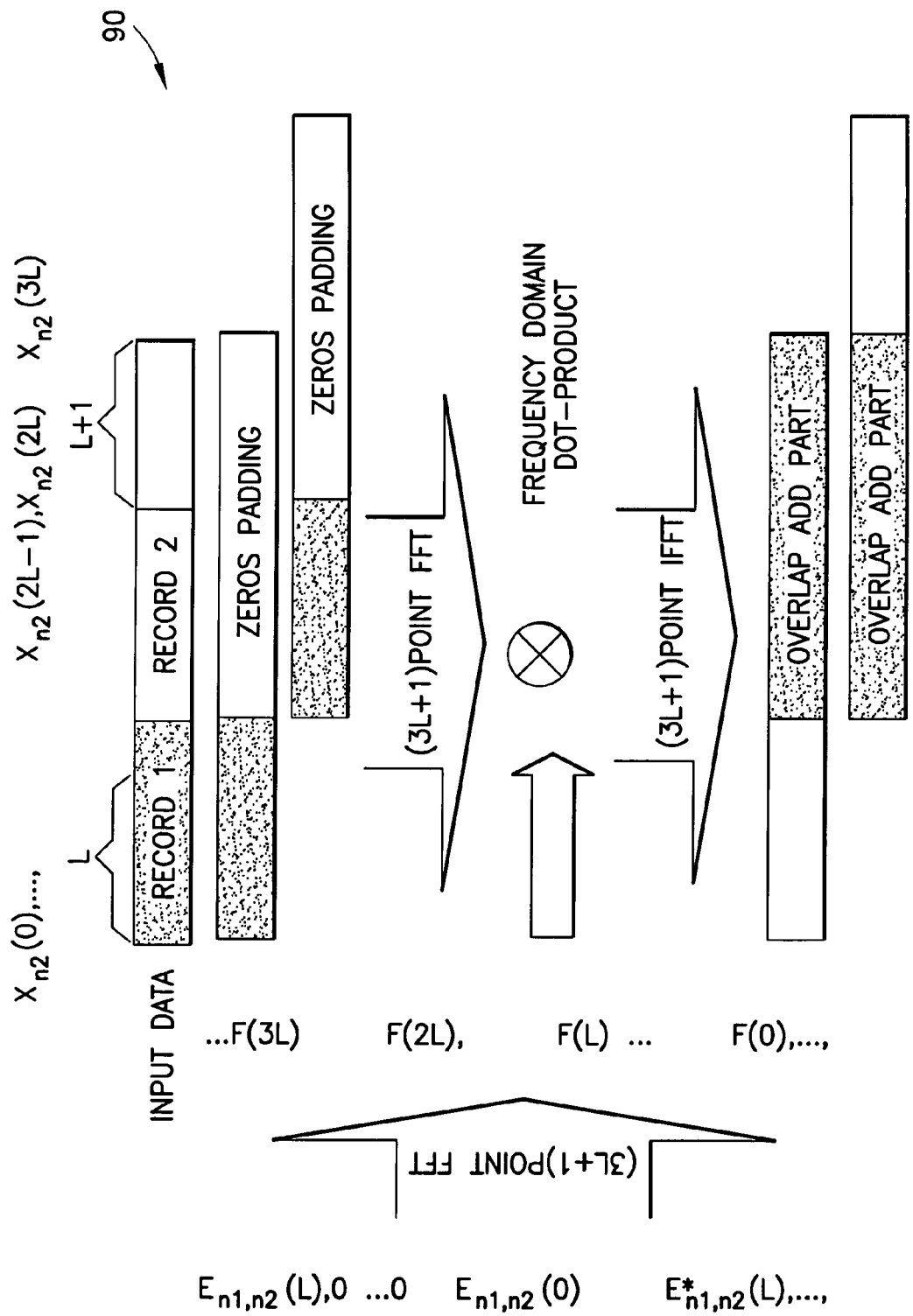
FIG. 6 illustrates an embodiment of an "overlap-add" FFT-based architecture further in accordance with the teachings of this invention, where the diagram is illustrative of both a hardware embodiment and a process embodiment.

The basic procedure implemented by a first embodiment of the "overlap-save" based FFT architecture 70 is shown in FIG. 5A. First, zeros are padded to the filter coefficients and then a FFT is carried out for the zero-padded filter vector. A record is removed from the long sequence and concatenated with the 2L values from the previous record. The FFT result of this record is multiplied with the FFT result of the filter. An IFFT transform is then carried out to obtain the time-domain samples. At least some samples are discarded from the result to avoid the frequency alias.

Because the length of the filter is $(2L+1)$, if one pads L zeros to the filter coefficients and takes a $(3L+1)$ point FFT, the size of the FFT for the data vector will also be $(3L+1)$. One may then consider that the long sequence contains the $(L+1)$ non-zeros values of $\Delta_{j-1,n2}$. The first 2L samples $[X_{n2}(0), \ldots, X_{n2}(2L-1)]=[\underline{0}_{1\times L}, \Delta_{j-1,n2}(0), \ldots, \Delta_{j-1(L-1)}]$ of the FFT is the overlap-save values from the first record, and the L+1 values are $[\Delta_{j-1,n2}(L), \underline{0}_{1\times L}]$. The two FFT results are multiplied in the frequency domain. Then, after the IFFT, the final result needs to drop the 2L points to avoid the frequency alias. The final valid result is given by $$\Gamma_{j,n1,n2}(l)=\lambda_{n1,n2}(l+2L) l\epsilon[0,L]. \quad (17)$$

The "overlap-save" based computing architecture 70 of FIG. 5A involves two FFTs and one IFFT of length (3L+1). In addition, there is one dot product of size (3L+1). The overall complexity is given by $3(3L+1)\log_2(3L+1)/2+(3L+1)$ complex multiplications. It can be thus appreciated that this embodiment of this invention reduces the order of complexity to $O(CL*\log_2(3L+1))$ from the square order $O((L+1)*(L+1))$, where C is a constant to indicate the complexity.

Reversed-Form FFT Acceleration Architecture

Although the order of complexity has been reduced in the "overlap-save" based computing architecture 70 embodiment shown in FIG. 5A, the value of the constant C before the order number can be further reduced. Because the expanded matrix $Z_{n1,n2}$ has many zero values, the inputs to the FFT contain many zeros. By pruning some branches in the FFT butterfly tree, one may reduce the state of the FFT computation. However, this involves making several customizations in the FFT module. It is more preferred, as described below, to implement complexity reduction to reduce the size of FFT by manipulating the matrix multiplication format.

It can be shown that the matrix multiplication in $\Gamma_{j,n1,n2}=R_{n1,n2}\Delta_{j-1,n2}$ is equivalent to the following reversed-format matrix-vector multiplication, where the elements of $\Delta_{j-1,n2}$ form the matrix and the independent elements of the correlation matrix form the multiplying vector, $$\Gamma_{j,n1,n2} = \begin{bmatrix} \Delta_{j-1,n2} & \cdots & \Delta_{j-1,n2}(0) & 0 & \cdots & 0 \\ 0 & \Delta_{j-1,n2}(L) & & \Delta_{j-1,n2}(0) & & \vdots \\ \vdots & \ddots & \ddots & & \ddots & \\ & & & & & 0 \\ 0 & \cdots & 0 & \Delta_{j-1,n2}(L) & & \Delta_{j-1,n2}(0) \end{bmatrix} * \begin{bmatrix} E^*_{n1,n2}[L] \\ \vdots \\ E_{n1,n2}[0] \\ \vdots \\ E_{n1,n2}[L] \end{bmatrix}. \quad (18)$$

Thus, it can viewed as a data sequence $Y_{n1,n2}=[E_{n1,n2}*[L], \ldots, E_{n1,n2}*[1], E_{n1,n2}[0], E_{n1,n2}[1], \ldots, E_{n1,n2}[L]]$ filtered by the tap coefficients $\Delta_{j-1,n2}$. With the overlap-save FFT-based FIR filtering architecture 80 shown in FIG. 5B, the filter $\Delta_{j-1,n2}$ is first padded with zeros to make a vector with length of (2L+1). The vector $[E_{n1,n2}*[L], \ldots, E_{n1,n2}*[1]]$ is considered as the L "overlap-save" values from the first block. These values are concatenated with the (L+1) new values $[E_{n1,n2}[0], E_{n1,n2}[1], \ldots, E_{n1,n2}[L]]$ to make a length of (2L+1) vector. This vector is input to the FFT module of length (2L+1). The FFT results are multiplied with the FFT result of the filter taps. An IFFT module computes the interim results and the first L samples are dropped to generate the final result as in $\Gamma_{j,n1,n2}(l)=\lambda_{n1,n2}(l+L)\ l\in[0,L]$. In the embodiment shown in FIG. 5B the number of complex multiplications is given by $3*(2L+1)*\log_2(3L+1)/2+(3L+1)$ for the preferred overlap save FFT architecture 80.

The optimized iterative algorithm with the reversed-form FFT acceleration is summarized as follows. For the $m^{th}$ transmit antenna 12, the iteration is accelerated with FFT in the frequency domain:

Initialization
$w_{m,0} = 0$ $\gamma_0 = \hat{h}_m; \Delta_0 = \begin{pmatrix} \Delta_{0,1} \\ \vdots \\ \Delta_{0,N} \end{pmatrix} = \hat{h}_m = \begin{pmatrix} \hat{h}_{m,1} \\ \vdots \\ \hat{h}_{m,N} \end{pmatrix}$ $\delta_0 = \gamma_0^H \gamma_0; \delta_1 = \delta_0$ for n1 = 1:N
   i. for n2 = 1:N $\Psi_{n1,n2} = \text{FFT}([E^*_{n1,n2}(L) \ \ldots \ E_{n1,n2}(0) \ \ldots \ E_{n1,n2}(L)])$ end n2
end n1
Iteration: for j=1:J $\Gamma_j = \begin{pmatrix} \Gamma_{0,1} \\ \vdots \\ \Gamma_{0,N} \end{pmatrix} = 0$ //Note: to compute MIMO matrix-vector multiplication
$\Gamma_j = R_{rr}\Delta_{j-1}$; in -continued frequency domain
   for n2=1:N $F_{j,n2} = \text{FFT}([\Delta^T_{j-1,n2} \ 0_{1\times L}])$ i. for n1=1:N
      $\Phi_{n1,n2} = F_{j,n2} \circ \Psi_{n1,n2}$
      $\Theta_{n1,n2} = \text{IFFT}(\Phi_{n1,n2})$
      $\Gamma_{j,n1,n2}(l) = \Theta_{n1,n2}(l+L) \ l \in [0, L]$
      $\Gamma_{j,n1} += \Gamma_{j,n1,n2}$
    1. end n1
   end n2
// Scalar computation and adjustment $\delta_{j+1} = \sum_{n=1}^{N} \Gamma^H_{j,n}\Gamma_{j,n}; \quad \omega_j = \sum_{n=1}^{N} \Delta^H_{j-1,n}\Gamma_{j,n}$ $\alpha = \delta_j/\omega_j; \quad \beta = \delta_{j+1}/\delta_j$ $w_{m,j} = w_{m,j-1} + \alpha\Delta_{j-1}$ $\gamma_j = \gamma_{j-1} - \alpha\Gamma_j$ $\Delta_j = \Gamma_j + \beta\Delta_{j-1}$ One may apply the commonality between different transmit antennas 12 and the iterations to further reduce the redundant computations. Because the FFT of the covariance vectors is not dependent on the iteration and transmit antenna, one may first compute the FFT results of the covariance vectors in the initialization part common to all M transmit antennas 12 and J iterations. The result is saved in distributed $\Psi_{N\times N}$ sub-vectors for the N receive antennas 14. The channel vector is also partitioned into N sub-vectors. This saves the number of FFTs for this part from $(N^2*J*M)$ with straightforward implementation to only $N^2$. In the iteration part, the $\Gamma_j$ vector is first partitioned and initialized to zero vectors. By rearranging the loop structure of n2 and n1, the FFT of the zero-padded $\Delta_{j-1,n2}$ vector is only necessary for the outer loop. Thus, one only needs to compute the frequency domain dot-product and the IFFT for individual $\Gamma_{j,n1,n2}$ in the inner loop. An accumulator generates the $\Gamma_{j,n1}$ sub-vectors. After the n1, n2 loop, two scalars $\delta_{j+1}$ and $\omega_j$ are computed from the inner product. Because the $\delta_{j+1}$ is actually a computation of the norm of $\Gamma_j$, one skilled in the art will appreciate that there is no need to compute a full complex multiplication at this point.

Simulation results for a MIMO HSDPA simulation chain are now presented. A comparison is made of the performance of four different techniques: the Direct-Matrix-Inverse (DMI) using Cholesky decompositions; the FFT accelerated CG algorithm in accordance with the embodiments of this invention; the FFT-based algorithm described by J. Zhang, T. Bhatt, G. Mandyam, "Efficient linear equalization for high data rate downlink CDMA signaling", 37th *IEEE Asilomar Conference on Signals, Systems and Computers*, 2003; and the LMS adaptive algorithm. Pedestrian-A and Pedestrian-B channels are simulated following the I-METRA channel model (see J. P. Kermoal, L. Schumacher, K. Pedersen and P. Mogensen, "A Stochastic MIMO radio channel model with experimental validation", *IEEE JSAC*, VOL. 20, NO. 6, AUGUST 2002, pp. 121-1226, and I-METRA project consortium, "The IST-2000-30148 I-METRA project", in http://www.ist-imetra.org. The chip rate for the transmit signal is 3.84Mcps, which is in compliance with the 3GPP HSDPA standard. Orthogonal-Variable-Spreading-Factor (OVSF) codes are generated from the Hadamard sequence. The spreading gain is G and the number of spreading codes is K for the data channel. The channel state information is estimated from the CPICH at the receiver. 10% of the total transmit power is dedicated to the pilot training symbols.

Figure 7:
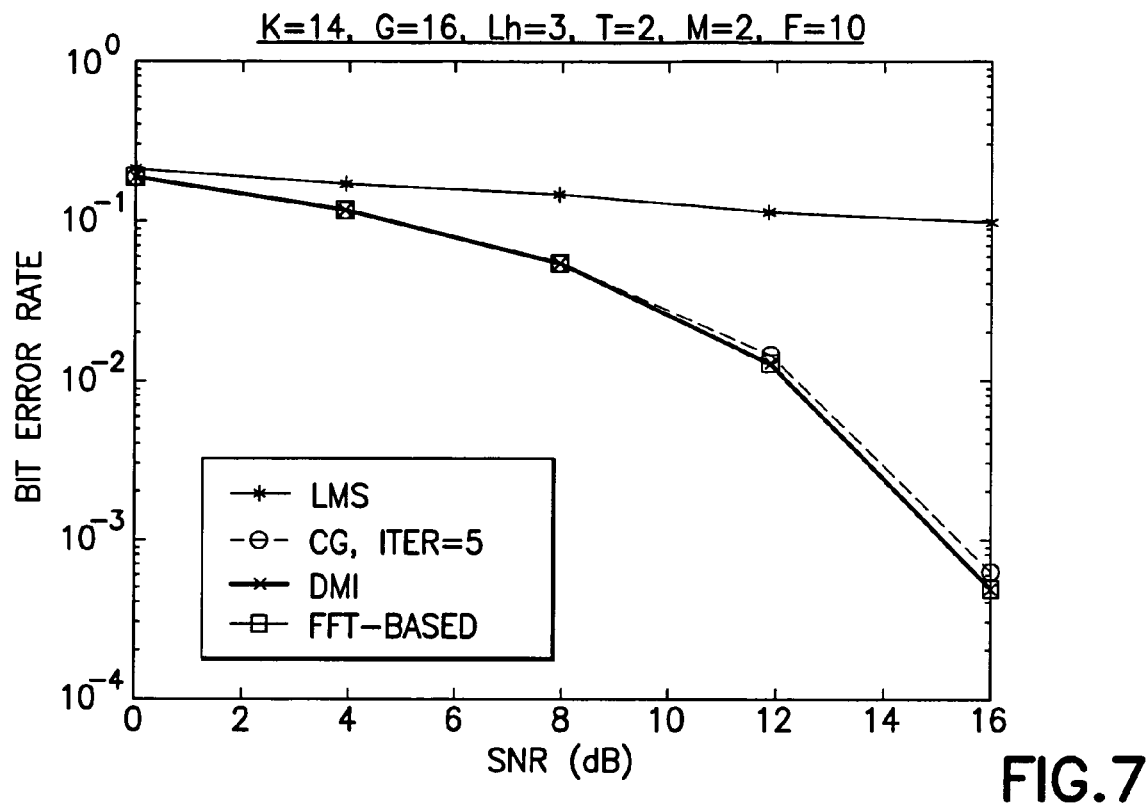
FIG. 7 is a graphical depiction of simulation results for Bit-Error-Rate for a fully loaded Pedestrian A channel with antenna configuration of 2×2.
Figure 8:
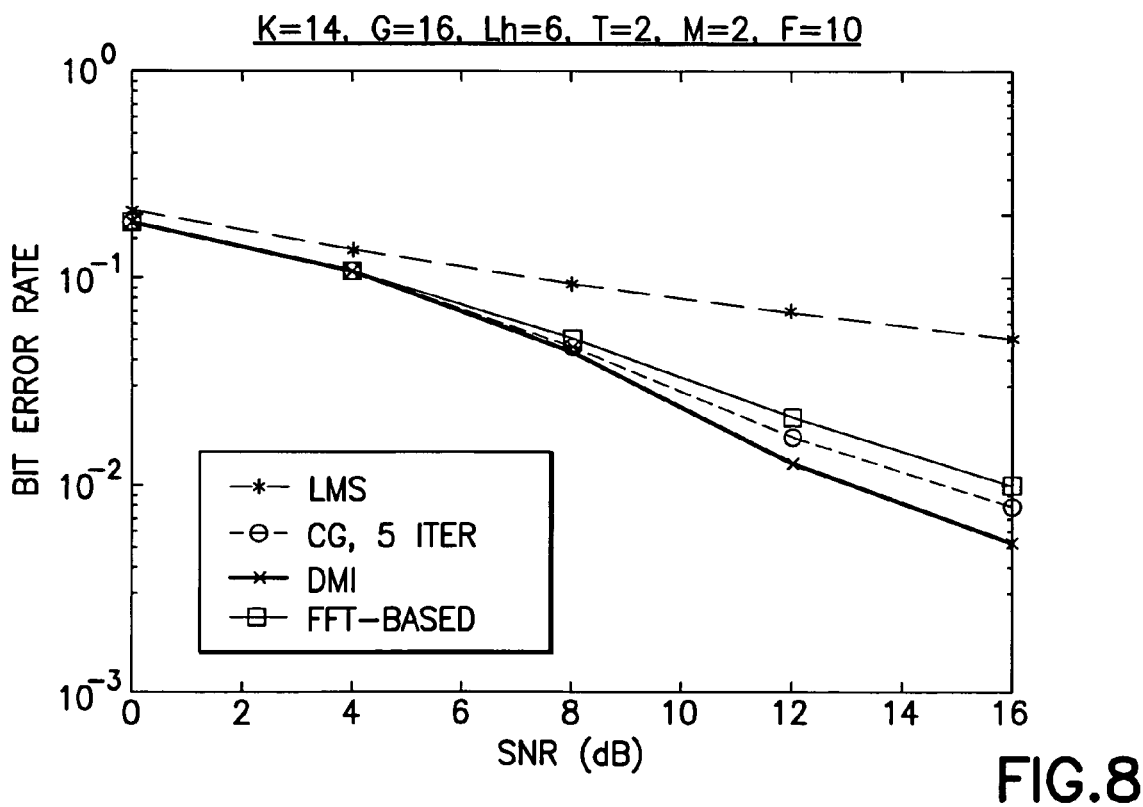
FIG. 8 is a graphical depiction of simulation results for Bit-Error-Rate for a fully loaded Pedestrian B channel with antenna configuration of 2×2.

FIG. 7 shows the performance of a fully loaded system for Pedestrian A and FIG. 8 shows the performance in Pedestrian B channels with a 2×2 configuration. In these Figures, $L_h$ is shown as the channel delay spread. For the Pedestrian-A channel case, both the FFT-accelerated CG and the FFT-based circulant approximation are very close to the DMI. In the Pedestrian-B channel, both the CG and FFT-based algorithms show small divergence from the DMI at the very high SNR range. For a fully loaded system, CG with five iterations seems to be slightly better than FFT-based algorithm. Both the CG and the circulant approximation FFT solution are much better than the LMS solution. This demonstrates the performance superiority of the LMMSE-based chip equalizer using the FFT-accelerated architecture in the CG iteration, in accordance with the embodiments of this invention.

Numerical Stability

The system stability is determined by the condition number of the system matrix. The condition number of a matrix is defined as the ratio of the maximal eigen value over the minimum eigen value, $$\kappa(R_{rr}) = \frac{\lambda_{\max}(R_{rr})}{\lambda_{\min}(R_{rr})}.$$

If the condition number is large, the matrix tends to be ill conditioned with the convention that $\kappa=\infty$ for a singular matrix. An ill conditioned matrix exhibits poor numerical sensitivity in matrix inverse operations. In the following, an analysis is made of the 2-norm condition number of the original covariance matrix and the circulant approximation matrix used in the FFT-based algorithm in J. Zhang et al. for a different SNR range. An examination is also carried out of the reciprocal of the condition of R in the 1-norm obtained by a Matlab-built function LAPACK condition estimator. If the matrix is well conditioned, the reciprocal of the condition is near 1.0, otherwise, if the matrix is badly conditioned, the reciprocal is near zero.

In Table II, the condition number $\kappa(R_{rr})$ and the reciprocal of the 1-norm condition number $\kappa_{rc}(R_{cir})$ are shown for an $L_h=12$ channel for different SNR range. The $R_{rr}$ and $R_{cir}$ are the original covariance matrix and the circulant matrix after adding the corners respectively. It may be seen that in the range of SNR=0 to 16 dB, the original matrix is reasonably well or mildly conditioned. The condition number increases for higher SNR while the $\kappa_{rc}$ decreases when the SNR increases. After the corner is added to make the $R_{cir}$, the condition number degrades in each of the SNR. This is compatible with the analysis and reduces the numerical stability in the equalizer tap solver. In Table III, an analysis is made of the condition for a worse channel case when $L_h=15$. It can be noted that the condition number is greater than the $L_h=12$ case. After adding the corner for $R_{cir}$ the condition number increases dramatically, especially for the SNR=24 dB, $\kappa(R_{cir})$ becomes 3.29e+3, which may lead to the singularity of the circulant matrix for numerical operation with limited word length.

TABLE II

THE CONDITION NUMBER AND RECIPROCAL VERSUS SNR FOR DIFFERENT MATRIX: $L_H = 12$.

| SNR(dB) | 0 | 4 | 8 | 12 | 16 |
|---|---|---|---|---|---|
| $\kappa(R_{rr})$ | 2.30 | 3.90 | 7.89 | 14.29 | 28.69 |
| $\kappa(R_{cir})$ | 2.70 | 5.09 | 10.99 | 21.48 | 53.52 |
| $\kappa_{rc}(R_{rr})$ | 0.31 | 0.19 | 0.075 | 0.045 | 0.019 |
| $\kappa_{rc}(R_{cir})$ | 0.18 | 0.11 | 0.049 | 0.025 | 0.013 |

TABLE III

THE CONDITION NUMBER AND RECIPROCAL VERSUS
SNR FOR DIFFERENT MATRIX: $L_H = 5$.

| SNR(dB) | 0 | 4 | 8 | 12 | 16 | 20 | 24 |
|---|---|---|---|---|---|---|---|
| $\kappa(R_{rr})$ | 3.84 | 7.89 | 16.56 | 32.06 | 55.32 | 64.33 | 92.20 |
| $\kappa(R_{cir})$ | 5.98 | 14.07 | 33.66 | 75.15 | 1.9e+2 | 1.54e+3 | 3.29e+3 |
| $\kappa_{rc}(R_{rr})$ | 0.097 | 0.042 | 0.019 | 1.06e−2 | 6.8e−3 | 5.7e−3 | 4.3e−3 |
| $\kappa_{rc}(R_{cir})$ | 0.064 | 0.023 | 0.011 | 5.4e−3 | 2.1e−3 | 2.76e−4 | 1.5e−4 |

Figure 9:
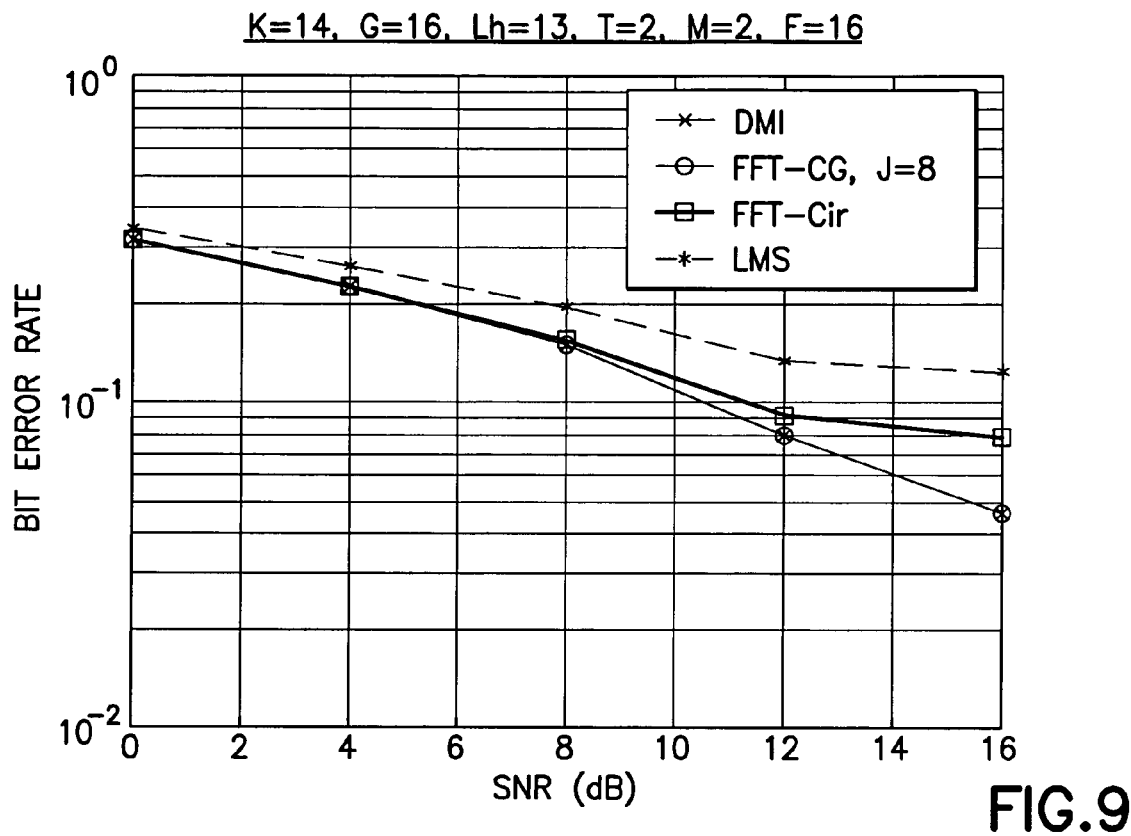
FIG. 9 is a graphical depiction of simulation results for BER performance of a fully loaded system with 13 taps for a modified Pedestrian B channel.
Figure 10:
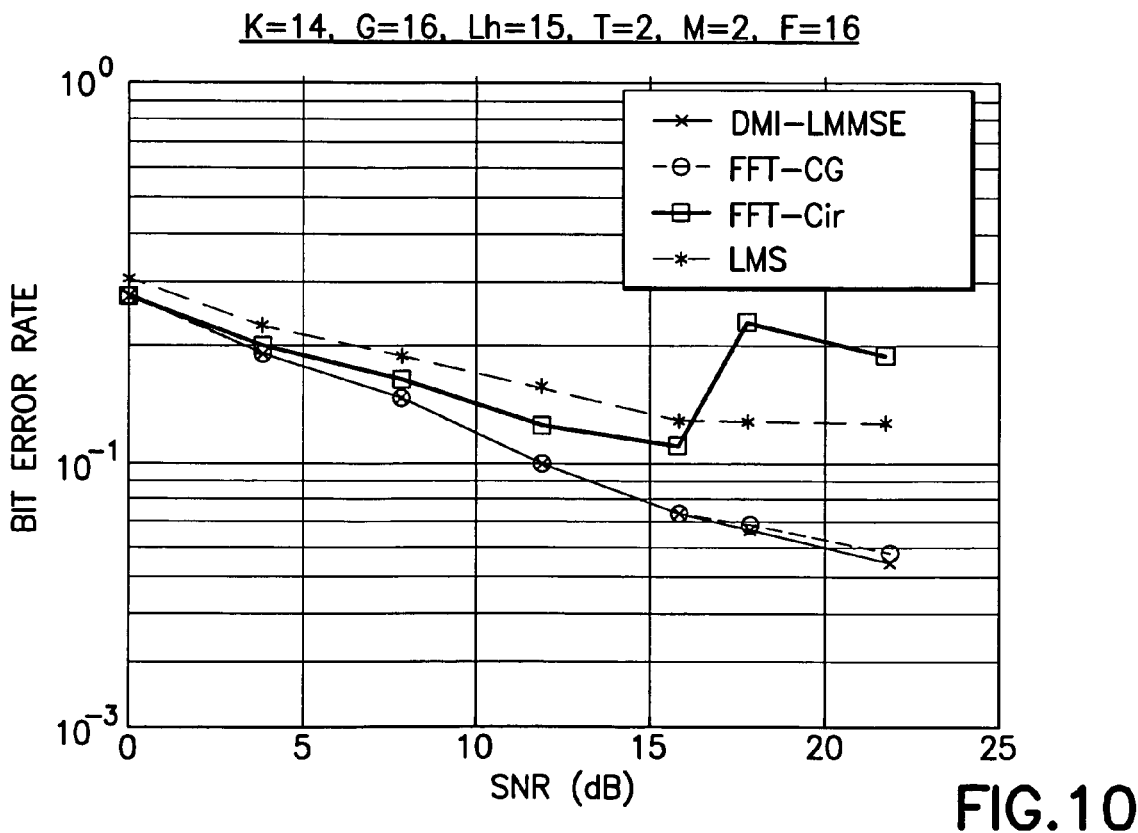
FIG. 10 is a graphical depiction of simulation results for BER performance of a fully loaded system with 15 taps for a modified Pedestrian B channel.

For this high SNR range, the performance degradation with the circulant matrix approximation is shown for a very bad channel situation. FIG. 9 shows the performance of a modified Pedestrian-B channel when $L_h=13$. FIG. 10 shows the performance for a channel when $L_h=15$. To show the potential of the iterative algorithm in accordance with this invention, eight iterations are computed. It is seen that in this bad channel case, the performance of the FFT-based algorithm with circulant approximation degrades dramatically. In the range of SNR>16 dB, the FFT-based circulant approximation actually fails because the high condition number corrupts the stability of the system equation, however the iterative algorithm with FFT acceleration follows the DMI solution very closely. This verifies the analysis of the condition number in the original and corner-compensated covariance matrix in Table III.

Complexity

Figure 11:
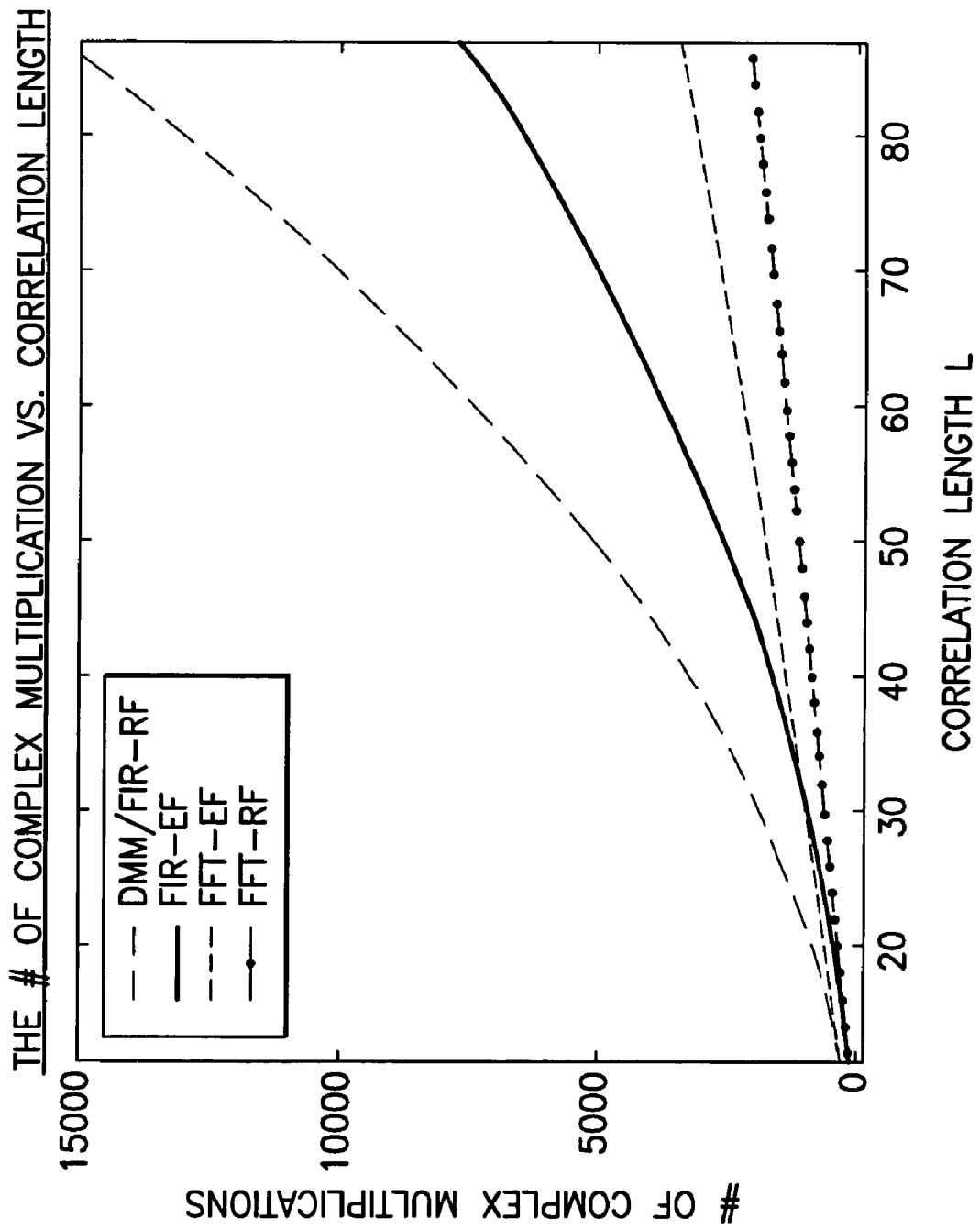
FIG. 11 is a graph that illustrates the complexity trend of various matrix-vector multiplication architectures.

In addition to the performance and numerical stability, the algorithm complexity is another important consideration. For the MIMO system with M transmit and N receive antennas, the covariance matrix size is NL×NL if the correlation window has L taps. It is clear that the DMI using Cholesky decomposition has the complexity of $O((NL)^3)$. The complexity of matrix-vector multiplication with size (L+1) in the CG iteration with different computing architectures is shown in Table IV. DMM (Direct-Matrix Multiplication) and the Reversed-Form FIR architectures have the same multiplication complexity. FIR-EF denotes the FIR-based architecture for the expanded-form matrix. Thus the original CG algorithm using the time-domain computing architecture has the complexity at the order of $O\{(MJ(N(L+1))^2\}$. For the frequency-domain architectures, FFT-EF denotes the FFT-based architecture with the Expanded-Form matrix. FFT-RF denotes the FFT-based architecture for the reversed-form matrix. It is seen that the constant of the FFT-RF complexity is reduced. The trend of the complexity for a single submatrix operation is shown in FIG. 11 for increasing channel length. The benefit of the FFT-RF is obvious for very long correlation length.

TABLE IV

THE COMPLEXITY COMPARISON FOR DIFFERENT
MATRIX-VECTOR MULTIPLICATION ARCHITECTURE

| Architecture | Number of Complex Multiplications |
|---|---|
| DMM/FIR-RF | (L + 1) * (L + 1) |
| FIR-EF | (2 * L + 1) * (L + 1) |
| FFT-EF | (3L + 1)[3/2 * $\log_2$(3L + 1) + 1] |
| FFT-RF | (2L + 1)[3/2 * $\log_2$(2L + 1) + 1] |

From the above set forth summary of the operation of the FFT-accelerated iterative covariance estimator and tap solver 42, the number of FFTs in the iterative MIMO chip equalizer 40 is ($N^2+M*N*J$) and the number of IFFTs is $M*(N^2+J)$. Moreover, there are $M*N^2*J*(2L+1)$ complex multiplications for the frequency-domain dot product and $1.5*M*N*J*(2L+1)$ complex multiplications for the inner product. For an $L_F$-point FFT/IFFT, the number of complex multiplications is "$L_F*\log_2(L_F)/2$". In sum, the complexity is:

$$[(M+1)*N^2+MJ*(N+1)]*(2L+1)/2*\log_2(2L+1)+ 1.5*M*N*J*(2L+1)$$

for the reversed form FFT-based iterative covariance estimator and tap solver 42. For simplicity, the dominant complexity is given by the order of $O\{(M*N^2+MNJ)/2*(2L+1)*\log_2(2L+1)\}$. It may be seen that the FFT-RF significantly accelerates the algorithm by reducing the number of multiplications from $O((NL)^2)$ to $O(NL*\log_2(N*L))$ with a small reduced order constant It has been shown in Y. Guo, J. Zhang, D. McCain, J. Cavallaro, "Efficient MIMO equalization for downlink multi-code CDMA: complexity optimization and comparative study", submitted to IEEE GlobeCom 2004, that the complexity of the FFT-based solution with circulant approximation is $O\{(N^2/2+2MN)(\log_2 L_F)+(N^3+MN^2)\}L_F/2\}$, where the $L_F \geq 3L+1$ is determined by simulation. Thus, the FFT-based acceleration in accordance with the embodiments of this invention has comparable complexity to the circulant approximation, and yet has the ability to provide enhanced numerical stability and BER performance in a long delay spread channel.

Based on the foregoing description it should be appreciated by those skilled in the art that the inventors have provided a novel FFT-accelerated iterative algorithm and architecture that reduces the complexity of the LMMSE-based MIMO chip-level equalizer 40 to $O(NL*\log_2(N*L))$, which lies in the category of superfast algorithms. This is accomplished by transformiing the direct form block-Toeplitz structure of the correlation matrix in the CG iteration to a reversed form block-Toeplitz structure. The time-domain matrix-vector multiplication is accelerated by an equivalent frequency-domain circular convolution with the FFT-based "overlap-save" architecture. The iteration rapidly refines a crude initial approximation to the actual final equalizer taps. Unlike the FFT-based equalizer that approximates the Toeplitz structure with a circulant structure by adding corners, the FFT-accelerated iterative algorithm in accordance with this invention does not increase the condition number of the system, and demonstrates strong numerical stability with rapid convergence rate. The simulation results presented above, and illustrated in FIGS. 7-11, shows significantly enhanced performance and complexity tradeoffs, particularly for the case of very long delay spread channels.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims.

As one non-limiting example, while the embodiments of the invention have been described above primarily in the context of the "overlap-save" architecture, the invention can also be implemented in the "overlap-add" type of FFT operation, wherein the overlap-add embodiment employs two FFTs for the input data sequence. Briefly, the input data sequence is first truncated to two records. Zeros are padded to each record to make the vector length the FFT length. Then the FFT results of both records are dot-multiplied with the FFT result of the zero-padded filter coefficients, and IFFTs are taken for these two output vectors. The first overlapped entries of the second record are next added to the tail of the overlapped entries of the first record. To obtain the final result, the initial ramp-up entries for the first record are dropped.

Referring in this regard to FIG. 6, there is shown an exemplary "overlap-add" architecture 90 for accomplishing the FFT-based acceleration of the matrix-vector multiplication. It can be seen from this straight-forward interpretation that the input sequence is broken down into several records of length L_F−L_FIR, if the FIR filter length is L_FIR and the length of the FFT is L_F. For the case of L_FIR=2L+1, L_F=3L+1, the record length would be L. Thus, if one does not examine the values in the X(i) sequence, there will be at least three FFT operations for the records of X(i). However, if one considers the fact that the X(i) sequence has zero entries at both the head record and the tail record, the complexity is then similar to the "overlap-save" based operations described above with respect to FIGS. 5A and 5B. From this point of view, therefore, the "overlap-add" and the "overlap-save" can be considered to be equivalent operations.

In general, the "overlap-add" type of FFT operation results in a similar complexity order as the "overlap-save" type of FFT embodiment, but it is slightly more complex in the control logic, the number of FFTs and the FFT length. Thus, while the "overlap-save" type of FFT operation is presently preferred for use in the MIMO chip-level equalizer 40, the embodiments of this invention are not limited for use to only the "overlap-save" type of FFT operation, and the "overlap-add" type of FFT operation may be used as well.

Furthermore, it should be appreciated that the single antenna type of downlink system can be considered as a special case of the MIMO receiver (referred to as single input, single output or SISO). Thus, the embodiments of this invention should be understood to be applicable as well to a SISO system.

Further, the embodiments of this invention may be embodied in hardware, as discrete circuitry or as circuitry implemented in an integrated circuit, such as an ASIC, or the embodiments of this invention may be implemented in software, such as computer instructions executed by a high speed digital signal processor (DSP), or the embodiments of this invention may be implemented as a combination of hardware and software.

However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. An apparatus, comprising:
an input configured to receive a signal;
a covariance estimator and tab solver configured to implement an iterative conjugate gradient CG algorithm and a Fast Fourier Transform FFT accelerated iterative equalizer algorithm having a complexity of order $O(N\log_2(N))$, where N is the dimension of a covariance matrix, where the covariance estimator and tab solver is configured to compute equalizer filter taps for the signal received by the input; and
an output configured to output the computed equalizer filter taps from the covariance estimator and tab solver.

2. An apparatus as in claim 1, further comprising: a Finite Impulse Response FIR filter configured to receive as inputs the computed equalizer filter taps and the received signal and to output an equalized estimate of the received signal.

3. An apparatus as in claim 1, where said apparatus comprises a Linear-Minimum-Mean-Square-Error LMMSE equalizer.

4. An apparatus as in claim 1, where said apparatus comprises a Linear-Minimum-Mean-Square-Error LMMSE chip-level equalizer.

5. An apparatus as in claim 1, where said apparatus forms a part of a code division multiple access CDMA receiver.

6. An apparatus as in claim 1, where said apparatus forms a part of a code division multiple access CDMA single input, single output SISO receiver.

7. An apparatus as in claim 1, where said apparatus forms a part of a code division multiple access CDMA multiple input, multiple output MIMO receiver.

8. An apparatus as in claim 1, where said covariance estimator and tab solver transforms a direct form block-Toeplitz structure to a reversed form block-Toeplitz structure.

9. An apparatus as in claim 1, where said covariance estimator and tab solver accelerates a time domain matrix multiplication by executing an equivalent frequency-domain circular convolution with a FFT architecture.

10. An apparatus as in claim 1, where said covariance estimator and tab solver accelerates a time domain matrix multiplication by executing an equivalent frequency-domain circular convolution with a FFT architecture, without increasing a condition number.

11. An apparatus as in claim 1, where said covariance estimator and tab solver comprises an overlap-save FFT architecture.

12. An apparatus as in claim 11, where said covariance estimator and tab solver operates to pad zeros to filter coefficients and perform a FFT operation for a zero-padded filter vector, to remove a record from a sequence and concatenate with 2L values from a previous record, to multiply the FFT result of the record with the FFT result of the filter vector, to perform an Inverse FFT operation to obtain time-domain samples, and to discard a plurality of samples from the result to avoid a frequency alias, where a value of L is selected from a group consisting of: a number of consecutive chips, a number of correlation window taps, and a record length.

13. An apparatus as in claim 12, where the filter is of length (2L+1), where L zeroes are padded to the filter coefficients, where the FFT operation is a (3L+1) point FFT operation, where the size of the FFT operation for a data vector is also (3L+1), and where the sequence contains the (L+1) non-zeros values of $\Delta_{j-1,n2}$, the first 2L samples $[X_{n2}(0), \ldots, X_{n2}(2L-1)]=[\underline{0}_{1\times L}, \Delta_{j-1,n2}(0), \ldots, \Delta_{j-1}(L-1)]$ of the FFT form the overlap-save values from a first record, and the L+1 values are

[Δ$_{j-1,n2}$(L), $\underline{0}_{1 \times L}$], and after the Inverse FFT operation, 2L points are dropped to avoid frequency alias such that a final result is given by:

$$\Gamma_{j,n1,n2}(l)=\lambda_{n1,n2}(l+2L) l\epsilon[0,L].$$

14. An apparatus as in claim 11, where the overlap-save FFT architecture involves the use of two FFTs and one Inverse FFT of length (3L+1), one dot product of size (3L+1), and where the overall complexity is given by 3(3L+1)log$_2$ (3L+1)/2+(3L+1) complex multiplications, where a value of L is selected from a group consisting of: a number of consecutive chips, a number of correlation window taps, and a record length.

15. An apparatus as in claim 11, where said convarience estimator and tab solver operates to pad zeros to filter coefficients to form a vector of length of (2L+1), where a vector [E$_{n1,n2}$*[L], ..., E$_{n1,n2}$*[1]] is considered as L "overlap-save" values from a first block that are concatenated with (L+1) new values [E$_{n1,n2}$[0], E$_{n1,n2}$[1], ..., E$_{n1,n2}$[L]] to form a vector of length (2L+1), where a FFT operation of length (2L+1) is performed on the vector and the result of the FFT operation is multiplied with a FFT result of filter taps, where an Inverse FFT forms interim results and the first L samples are removed to generate a final result as $\Gamma_{j,n1,n2}(l)=\lambda_{n1,n2}(l+L) l\epsilon[0,L]$, and where the overall complexity is given by 3*(2L+1)*log$_2$(3L+ 1)/2+(3L+1) complex multiplications, where a value of L is selected from a group consisting of: a number of consecutive chips, a number of correlation window taps, and a record length.

16. An apparatus as in claim 1, where said covariance estimator and tab solver comprises an overlap-add FFT architecture.

17. An apparatus as in claim 16, where said covariance estimator and tab solver operates to truncate an input data sequence to two records, to pad zeros to each record to make the vector length equal the FFT length, to perform a FFT operation for each record and to dot multiply the FFT result for each record with the FFT result of zero-padded filter coefficients, to take an Inverse FFT for the two output vectors, to add first overlapped entries of the second record to a tail of the overlapped entries of the first record, and to remove initial ramp-up entries for the first record.

18. A code division multiple access CDMA receiver comprising:
an input configured to receive a signal; and
a Linear-Minimum-Mean-Square-Error LMMSE-based chip-level equalizer comprising a covariance estimator and tap solver and a Finite Impulse Response FIR filter, where said covariance estimator and tap solver is operable to implement an iterative conjugate gradient CG algorithm and a Fast Fourier Transform FFT accelerated iterative chip-level equalizer algorithm having a complexity of order O(N log$_2$(N)), where N is the dimension of a covariance matrix, said covariance estimator and tab solver comprising one of an overlap-save or an overlap-add FFT architecture, where the covariance estimator and tab solver is configured to compute equalizer filter taps for the signal received by the input and to output the computed equalizer filter taps to the FIR filter, where the FIR filter is configured to receive as inputs the computed equalizer filter taps and the received signal and to output an equalized estimate of the received signal.

19. A CDMA receiver as in claim 18, where said covariance estimator and tap solver is configured to transform a direct form block-Toeplitz structure to a reversed form block-Toeplitz structure.

20. A CDMA receiver as in claim 18, where said covariance estimator and tab solver is configured to accelerate a time domain matrix multiplication by performing an equivalent frequency-domain circular convolution.

21. A CDMA receiver as in claim 18, where said LMMSE-based chip-level equalizer is implemented using circuitry.

22. A CDMA receiver as in claim 18, where said LMMSE-based chip-level equalizer is implemented using software.

23. A CDMA receiver as in claim 18, where said LMMSE-based chip-level equalizer is implemented using a combination of circuitry and software.

24. A CDMA receiver as in claim 18, where said CDMA receiver comprises a single input, single output SISO CDMA receiver.

25. A CDMA receiver as in claim 18, where said CDMA receiver comprises a multiple input, multiple output MIMO CDMA receiver.

26. An apparatus, comprising:
means for receiving a signal;
covariance estimator and tap solver means for executing an iterative conjugate gradient CG algorithm and a Fast Fourier Transform FFT accelerated iterative equalizer algorithm having a complexity of order O(N log$_2$(N)), where N is the dimension of a covariance matrix, where the covariance estimator and tab solver means is further for computing equalizer filter taps for the signal received by the means for receiving; and
means for outputting the computed equalizer filter taps from the covariance estimator and tab solver means.

27. An apparatus as in claim 26, where said apparatus forms a part of a code division multiple access CDMA downlink receiver.

28. An apparatus as in claim 26, where said apparatus comprises a Linear-Minimum-Mean-Square-Error LMMSE equalizer.

29. An equalizer as in claim 26, where said apparatus comprises a Linear-Minimum-Mean-Square-Error LMMSE chip-level equalizer.

30. An equalizer as in claim 26, where said apparatus forms a part of a code division multiple access CDMA receiver having one of a single input, single output SISO architecture or a multiple input, multiple output MIMO architecture.

31. An apparatus apparatus as in claim 26, further comprising means for transforming a direct form block-Toeplitz structure to a reversed form block-Toeplitz structure.

32. An apparatus as in claim 26, further comprising means for accelerating a time domain matrix multiplication by executing an equivalent frequency-domain circular convolution with a FFT architecture.

33. An apparatus as in claim 26, where said covariance estimator and tab solver means comprises one of an overlap-save FFT architecture or an overlap-add FFT architecture.

34. A method, comprising:
receiving a signal; obtaining, by a component, equalizer filter taps for the received signal by executing an iterative conjugate gradient CG algorithm and a Fast Fourier Transform FFT accelerated iterative procedure having a complexity of order O(N log2(N)), where N is the dimension of a covariance matrix; and outputting the obtained equalizer filter taps to another component.

35. A method as in claim 34, where said FFT accelerated iterative procedure is implemented by a covariance estimator and tap solver having an output coupled to a Finite Impulse Response FIR filter.

36. A method as in claim 34, where obtaining the equalizer filter taps uses a Linear-Minimum-Mean-Square-Error LMMSE technique.

37. A method as in claim 34, where obtaining the equalizer filter taps uses a Linear-Minimum-Mean-Square-Error LMMSE chip-level technique.

38. A method as in claim 34, where where the method is performed by a code division multiple access CDMA receiver.

39. A method as in claim 34, where where the method is performed by a code division multiple access CDMA single input, single output SISO receiver.

40. A method as in claim 34, where where the method is performed by a code division multiple access CDMA multiple input, multiple output MIMO receiver.

41. A method as in claim 34, where obtaining the equalizer filter taps comprises transforming a direct form block-Toeplitz structure to a reversed form block-Toeplitz structure.

42. A method as in claim 34, where obtaining the equalizer filter taps comprises accelerating a time domain matrix multiplication by executing an equivalent frequency-domain circular convolution with a FFT architecture.

43. A method as in claim 34, where obtaining the equalizer filter taps comprises using an overlap-save FFT operation.

44. A method as in claim 43, where using the overlap-save FFT technique comprises padding zeros to filter coefficients and performing a FFT operation for a zero-padded filter vector, removing a record from a sequence and concatenating with 2L values from a previous record, multiplying the FFT result of the record with the FFT result of the filter vector, performing an Inverse FFT operation to obtain time-domain samples, and discarding a plurality of samples from the result, where a value of L is selected from a group consisting of: a number of consecutive chips, a number of correlation window taps, and a record length.

45. A method as in claim 44, where the filter is of length (2L+1), where L zeroes are padded to the filter coefficients, where the FFT operation is a (3L+1) point FFT operation, where the size of the FFT operation for a data vector is also (3L+1), and where the sequence contains the (L+1) non-zeros values of $\Delta_{j-1,n2}$, the first 2L samples $[X_{n2}(0), \ldots, X_{n2}(2L-1)] = [\underline{0}_{1 \times L}, \Delta_{j-1,n2}(0), \ldots, \Delta_{j-1}(L-1)]$ of the FFT form the overlap-save values from a first record, and the L+1 values are $[\Delta_{j-1,n2}(L), \underline{0}_{1 \times L}]$, and after the Inverse FFT operation, 2L points are dropped such that a final result is given by:

$$\Gamma_{j,n1,n2}(l) = \lambda_{n1,n2}(l+2L) l \in [0,L].$$

46. A method as in claim 43, where using the overlap-save FFT technique comprises executing two FFTs and one Inverse FFT of length (3L+1), generating one dot product of size (3L+1), where the overall complexity is given by $3(3L+1)\log_2(3L+1)/2+(3L+1)$ complex multiplications, where a value of L is selected from a group consisting of: a number of consecutive chips, a number of correlation window taps, and a record length.

47. A method as in claim 43, where obtaining the equalizer filter taps comprises padding zeros to filter coefficients to form a vector of length of (2L+1), where a vector $[E_{n1,n2}*[L], E_{n1,n2}*[1]]$ is considered as L "overlap-save" values from a first block that are concatenated with (L+1) new values $[E_{n1,n2}[0], E_{n1,n2}[1], \ldots, E_{n1,n2}[L]]$ to form a vector of length (2L+1), performing a FFT operation of length (2L+1) on the vector and multiplying the result of the FFT operation with a FFT result of filter taps, taking an Inverse FFT to form interim results and removing the first L samples to generate a final result as $\Gamma_{j,n1,n2}(l) = \lambda_{n1,n2}(l+L) l \in [0,L]$, where the overall complexity is given by $3*(2L+1)*\log_2(3L+1)/2+(3L+1)$ complex multiplications, where a value of L is selected from a group consisting of: a number of consecutive chips, a number of correlation window taps, and a length.

48. A method as in claim 34, where obtaining the equalizer filter taps comprises using an overlap-add FFT operation.

49. A method as in claim 48, where obtaining the equalizer filter taps comprises truncating an input data sequence to two records, padding zeros to each record to make the vector length equal the FFT length, performing a FFT operation for each record and dot multiplying the FFT result for each record with the FFT result of zero-padded filter coefficients, taking an Inverse FFT for the two output vectors, adding first overlapped entries of the second record to a tail of the overlapped entries of the first record, and removing certain entries for the first record.

50. A data storage medium storing program instructions operable to direct a data processor to perform operations comprising:
  obtaining equalizer filter taps for a received signal by executing an iterative conjugate gradient CG algorithm and a Fast Fourier Transform FFT accelerated iterative equalizer procedure having a complexity of order O(N log$_2$(N)), where N is the dimension of a covariance matrix; and
  outputting the obtained equalizer filter taps.

51. A data storage medium as in claim 50, where said obtaining of equalizer filter taps is implemented by operating a tap solver having an output coupled to a Finite Impulse Response filter.

52. A data storage medium as in claim 50, where said obtaining of equalizer filter taps comprises using a Linear-Minimum-Mean-Square-Error LMMSE technique.

53. A data storage medium as in claim 50, where said obtaining of equalizer filter taps comprises using a Linear-Minimum-Mean-Square-Error LMMSE chip-level technique.

54. A data storage medium as in claim 50, where the data storage medium comprises part of a code division multiple access CDMA receiver.

55. A data storage medium as in claim 50, where the data storage medium comprises part of a code division multiple access CDMA single input, single output SISO receiver.

56. A data storage medium as in claim 50, where the data storage medium comprises part of a code division multiple access CDMA multiple input, multiple output MIMO receiver.

57. A data storage medium as in claim 50, where the operation comprises transforming a direct form block-Toeplitz structure to a reversed form block-Toeplitz structure.

58. A data storage medium as in claim 50, where said obtaining of equalizer filter taps comprises accelerating a time domain matrix multiplication by executing an equivalent frequency-domain circular convolution with a FFT architecture.

59. A data storage medium as in claim 50, where said obtaining of equalizer filter taps comprises using one of an overlap-save FFT operation or an overlap-add FFT operation.

60. An apparatus as in claim 1, where the apparatus comprises a chip-level equalizer configured to operate as a Code Division Multiple Access CDMA front-end, where said apparatus is further configured to estimate chip samples of the signal received by the input, to restore spreading code orthogonality for the signal received by the input and to suppress inter-symbol interference for the signal received by the input.

* * * * *